US011469961B2

(12) United States Patent
Maguire et al.

(10) Patent No.: US 11,469,961 B2
(45) Date of Patent: Oct. 11, 2022

(54) METHODS, DEVICES, AND SYSTEMS FOR MANAGING A FEDERATED NETWORK SLICE

(71) Applicant: Telefonaktiebolaget LM Ericsson (publ), Stockholm (SE)

(72) Inventors: Patrick Maguire, County Westmeath (IE); Henrik Basilier, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/954,870

(22) PCT Filed: Dec. 20, 2017

(86) PCT No.: PCT/EP2017/083923
§ 371 (c)(1),
(2) Date: Jun. 17, 2020

(87) PCT Pub. No.: WO2019/120524
PCT Pub. Date: Jun. 27, 2019

(65) Prior Publication Data
US 2021/0092020 A1    Mar. 25, 2021

(51) Int. Cl.
*H04L 41/0896* (2022.01)
*H04W 28/06* (2009.01)
(52) U.S. Cl.
CPC ......... *H04L 41/0896* (2013.01); *H04W 28/06* (2013.01)
(58) Field of Classification Search
CPC .......................... H04L 41/0896; H04W 28/06
See application file for complete search history.

(56) References Cited

U.S. PATENT DOCUMENTS

2016/0328259 A1\* 11/2016 Xia ................... H04L 41/0813
2016/0353367 A1   12/2016 Vrzic et al.
(Continued)

OTHER PUBLICATIONS

PCT Notification of Transmittal of the International Search Report and the Written Opinion of the International Searching Authority, or the Declaration issued for International application No. PCT/EP2017/083923—dated Oct. 16, 2018.
(Continued)

*Primary Examiner* — Azizul Choudhury
(74) *Attorney, Agent, or Firm* — Baker Botts, LLP

(57) ABSTRACT

Methods (700,800,900), devices (12,20,30,40), and systems (500,540,560,570,600) for managing a federated network slice (602) providing an extension of one or more virtual network functions (620) from a first network domain (502, 608) to a second network domain (504,610). One method (700), by a second orchestration manager (20,512) of the second network domain (504,610), includes accessing (702) a first virtual network function management component (514,562) for extension of the one or more virtual network functions (620) from the first network domain (502,608) to the second network domain (504,610). The method (700) further includes initiating registration (704) of the first virtual network function management component (514,562) with a look-up service (518) to generate a first association between a first name of the first virtual network function management component and a first location of the first virtual network function management component in the second network domain (504,610). The method (700) further includes initiating transmission (706) to the first network domain (502,608) of the first name of the first virtual network function management component (514,562).

18 Claims, 13 Drawing Sheets

(56) References Cited

U.S. PATENT DOCUMENTS

2017/0086049 A1    3/2017  Vrzic
2017/0141973 A1    5/2017  Vrzic
2018/0077024 A1*  3/2018  Zhang ................. H04L 63/0272

OTHER PUBLICATIONS

NGMN 5G White Paper, a Deliverable by the NGMN Alliance (Version 1.0), Project: NGMN 5g Initiative—Feb. 17, 2015.

* cited by examiner

METHODS, DEVICES, AND SYSTEMS FOR MANAGING A FEDERATED NETWORK SLICE

PRIORITY

This nonprovisional application is a U.S. National Stage Filing under 35 U.S.C. § 371 of International Patent Application Serial No. PCT/EP2017/083923 filed Dec. 20, 2017 and entitled "METHODS, DEVICES, AND SYSTEMS FOR MANAGING A FEDERATED NETWORK SLICE" which is hereby incorporated by reference in its entirety.

TECHNICAL FIELD

The present disclosure relates to methods, devices, and systems for managing a federated network slice.

BACKGROUND

Telecommunication networks continue to evolve. 5th Generation (5G) networks are expected to bring about a major telecommunications transformation, providing an end-to-end infrastructure which is capable of providing a consistently high user quality of experience across heterogeneous network environments and for a wide range of use cases. Depending on the particular use case, performance demands may require high throughput, low latency, high reliability, high connectivity density, and/or high mobility range, among others. Example use cases include vehicle-to-everything (V2X) services; enhanced mobile broadband (eMBB) services, in particular using fixed-mobile convergence (FMC); and massive Internet of Things (mIoT) services, covering smart households, smart grid, smart agriculture, and smart meters; among others. To facilitate such a transformation, the underlying telecommunications network infrastructure is subject to continuing development.

Offering the various use cases by providing a purpose-built network for each use case would lead to high physical infrastructure costs for network operators and inefficient use of valuable radio frequency resources. Accordingly, to enable fulfilment of the various use cases expected in future telecommunications networks, networks may be provided based on a logical telecommunications network architecture sitting above the underlying physical telecommunications network architecture.

Offering logical telecommunications network resources in this way allows for the provision of separate, virtualized networks, also called network slices. A network slice is a logical network or partition, which includes a logically grouped subset of network resources and/or network functions, for serving a particular use case. A network slice may be offered, for example, either by a network operator, or by an enterprise using a network operator's infrastructure, to provide a communication service to a user or a device. With some use cases, communication services may be offered on demand. In such a case, a network slice may be provided on an "as-a-service" basis, in the form of a network slice as a service (NSaaS).

In order to ensure that a network slice meets service level requirements for the use case the network slice is enabling, the network slice may be subject to predetermined implementational and operational specifications. Such specifications may characterize the radio access technology, bandwidth, end-to-end latency, reliability, (guaranteed) quality of service, security, and isolation, among others. For example, a service level agreement (SLA) may be associated with a network slice, indicating the treatment to which services provided within the network slice should be subjected. In this way, network slices may facilitate the fulfilment of various performance demands of future use cases.

A further expectation of 5G, or other future, network technologies is that some use cases may also require connectivity to be provided across multiple geographical regions. This may involve connectivity either within an individual country, between different countries, or spanning different continents, to offer global reach for enterprises and end users. For a communication service provider—be that a network operator or an enterprise offering communication services as a tenant on a network operator's network—to be able to offer or provide communication services beyond the bounds of a home network, inter-operator agreements may be secured to allow a user/device to be provided with communication services from or through a visited network when the user/device is unable to be served by the home network.

Visited network services may be provided in two ways. In one approach, services are accessed in the visited network, but at least in part executed in the home network. This approach is referred to as "home routing". Home routing offers the advantage of maintaining service control by the home network, but has the disadvantage of potentially poor service experience, in particular in respect of latency and other SLA issues.

In the other approach, services are accessed and executed in the visited network. This approach is referred to as "local break-out". Local break-out offers the advantage of acceptable service experience, but has the disadvantage that the home network does not have control of the services. This can make it difficult for a communication service provider to ensure a consistent service experience between the home network and any visited network.

It would therefore be desirable to facilitate the provision of communication services using a visited network. In particular, it would be desirable to address the shortcomings of home routing and local break-out approaches. It would also be desirable to facilitate the provision of communication services using a visited network while benefitting from the advantages offered by network slicing.

SUMMARY

According to a first aspect, there is provided a method for managing a federated network slice. The federated network slice comprises an extension of one or more virtual network functions from a first network domain to a second network domain. The method comprises accessing, by a second orchestration manager of the second network domain, a first virtual network function management component for extension of the one or more virtual network functions from the first network domain to the second network domain. The method further comprises initiating, by the second orchestration manager, registration of the first virtual network function management component with a look-up service to generate a first association between a first name of the first virtual network function management component and a first location of the first virtual network function management component in the second network domain. The method further comprises initiating, by the second orchestration manager, transmission to the first network domain of the first name of the first virtual network function management component.

In this way, management of a federated network slice may be provided between a first network domain and a second network domain. In particular, a federated network slice may be orchestrated in a second network domain based on a first virtual network function management component for extension of one or more virtual network functions from the first network domain to the second network domain. Since the first virtual network function management component is arranged for extension of the one or more virtual network functions from the first network domain to the second network domain, problems with orchestration of, and/or interoperability between, first infrastructure resources of the first network domain and second infrastructure resources of the second network domain for the federated network slice may be overcome. A federated network slice may in this way be orchestrated in the second network domain, regardless of any differences in physical infrastructure, logical infrastructure, and/or associated orchestration and management resources between the first and second network domains prior to implementation of the described method. In particular, the described method provides for multivendor orchestration. The first virtual network function management component may support, orchestrate, and/or manage one or more vendor-specific virtual network functions from the first network domain in the second network domain.

According to a further aspect, there is provided a second orchestration manager of a second network domain for managing a federated network slice. The federated network slice comprises an extension of one or more virtual network functions from a first network domain to the second network domain. The second orchestration manager is configured to access a first virtual network function management component for extension of the one or more virtual network functions from the first network domain to the second network domain. The second orchestration manager is further configured to initiate registration of the first virtual network function management component with a look-up service to generate a first association between a first name of the first virtual network function management component and a first location of the first virtual network function management component in the second network domain. The second orchestration manager is further configured to initiate transmission to the first network domain of the first name of the first virtual network function management component.

According to a further aspect, there is provided a method for managing a federated network slice. The federated network slice comprises an extension of one or more virtual network functions from a first network domain to a second network domain. The method comprises initiating, by a first orchestration manager of the first network domain, transmission to the second network domain of an instruction to access a first virtual network function management component for extension of the one or more virtual network functions from the first network domain to the second network domain. The method further comprises receiving, by the first orchestration manager, a first name of the first virtual network function management component, the first virtual network function management component having been registered with a look-up service to generate a first association between the first name of the first virtual network function management component and a first location of the first virtual network function management component in the second network domain. The method further comprises initiating, by the first orchestration manager, storage in the first network domain of the first name of the first virtual network function management component.

According to a further aspect, there is provided a first orchestration manager of a first network domain for managing a federated network slice. The federated network slice comprises an extension of one or more virtual network functions from the first network domain to a second network domain. The first orchestration manager is configured to initiate transmission to the second network domain of an instruction to access a first virtual network function management component for extension of the one or more virtual network functions from the first network domain to the second network domain. The first orchestration manager is further configured to receive a first name of the first virtual network function management component, the first virtual network function management component having been registered with a look-up service to generate a first association between the first name of the first virtual network function management component and a first location of the first virtual network function management component in the second network domain. The first orchestration manager is further configured to initiate storage in the first network domain of the first name of the first virtual network function management component.

According to a further aspect, there is provided a method for managing a federated network slice. The federated network slice comprises an extension of one or more virtual network functions from a first network domain to a second network domain. The method comprises receiving, by a second network slice orchestration manager of the second network domain, a request to generate the federated network slice, the request comprising an indication of a first name of a first virtual network function management component for extension of the one or more virtual network functions from the first network domain to the second network domain. The method further comprises generating, by the second network slice orchestration manager, a look-up request to a look-up service having stored therein a first association between the first name of the first virtual network function management component and a first location of the first virtual network function management component in the second network domain, the look-up request being for the first location. The method further comprises initiating, by the second network slice orchestration manager, instantiation of the first virtual network function management component from the first location.

According to a further aspect, there is provided a second network slice orchestration manager of a second network domain for managing a federated network slice. The federated network slice comprises an extension of one or more virtual network functions from a first network domain to the second network domain. The second network slice orchestration manager is configured to receive a request to generate the federated network slice, the request comprising an indication of a first name of a first virtual network function management component for extension of the one or more virtual network functions from the first network domain to the second network domain. The second network slice orchestration manager is further configured to generate a look-up request to a look-up service having stored therein a first association between the first name of the first virtual network function management component and a first location of the first virtual network function management component in the second network domain, the look-up request being for the first location. The second network slice orchestration manager is further configured to initiate instantiation of the first virtual network function management component from the first location.

According to a further aspect, there is provided a domain manager of a first network domain. The domain manager is configured to manage the federated network slice generated according to any of the methods described herein.

According to a further aspect, there is provided a method for managing a federated network slice. The method comprises a combination of any ones of the methods described herein.

According to a further aspect, there is provided a method of providing multivendor federated network slice orchestration. The method comprises a combination of any ones of the methods described herein.

According to a further aspect, there is provided a device for managing a federated network slice. The device comprises processing circuitry and a memory. The memory stores instructions which, when executed by the processing circuitry, cause the processing circuitry to perform the method of any of the methods described herein.

According to a further aspect, there is provided a system for managing a federated network slice. The system comprises one or more of the second orchestration manager described herein, the first orchestration manager described herein, the second network slice orchestration manager described herein, and/or one or more devices described herein.

According to a further aspect, there is provided a computer program. The computer program comprises instructions which, when executed by processing circuitry, cause the processing circuitry to perform any of the methods described herein.

According to a further aspect, there is provided a computer program product. The computer program product comprises instructions which, when executed by processing circuitry, cause the processing circuitry to perform any of the methods described herein.

According to a further aspect, there is provided a second orchestration manager of a second network domain for managing a federated network slice. The federated network slice comprises an extension of one or more virtual network functions from a first network domain to the second network domain. The second orchestration manager comprises an access module for accessing a first virtual network function management component for extension of the one or more virtual network functions from the first network domain to the second network domain. The second orchestration manager further comprises a registration initiation module for initiating registration of the first virtual network function management component with a look-up service to generate a first association between a first name of the first virtual network function management component and a first location of the first virtual network function management component in the second network domain. The second orchestration manager further comprises a transmission initiation module for initiating transmission to the first network domain of the first name of the first virtual network function management component.

According to a further aspect, there is provided a first orchestration manager of a first network domain for managing a federated network slice. The federated network slice comprises an extension of one or more virtual network functions from the first network domain to a second network domain. The first orchestration manager comprises a transmission initiation module for initiating transmission to the second network domain of an instruction to access a first virtual network function management component for extension of the one or more virtual network functions from the first network domain to the second network domain. The first orchestration manager further comprises a receiving module for receiving a first name of the first virtual network function management component, the first virtual network function management component having been registered with a look-up service to generate a first association between the first name of the first virtual network function management component and a first location of the first virtual network function management component in the second network domain. The first orchestration manager further comprises a storage initiation module for initiating storage in the first network domain of the first name of the first virtual network function management component.

According to a further aspect, there is provided a second network slice orchestration manager of a second network domain for managing a federated network slice. The federated network slice comprises an extension of one or more virtual network functions from a first network domain to the second network domain. The second network slice orchestration manager comprises a request receiving module for receiving a request to generate the federated network slice, the request comprising an indication of a first name of a first virtual network function management component for extension of the one or more virtual network functions from the first network domain to the second network domain. The second network slice orchestration manager further comprises a request generation module for generating a look-up request to a look-up service having stored therein a first association between the first name of the first virtual network function management component and a first location of the first virtual network function management component in the second network domain, the look-up request being for the first location. The second network slice orchestration manager further comprises an instantiation initiation module for initiating instantiation of the first virtual network function management component from the first location.

According to a further aspect, there is provided a domain manager of a first network domain for managing a federated network slice. The domain manager comprises a management module for managing the federated network slice generated according to any of the methods described herein.

Other preferred features and advantages of the invention are set out in the description and in the dependent claims which are appended hereto.

BRIEF DESCRIPTION OF THE DRAWINGS

The invention may be put into practice in a number of ways and some embodiments will now be described, by way of non-limiting example only, with reference to the following figures, in which.

DETAILED DESCRIPTION

Figure 1:
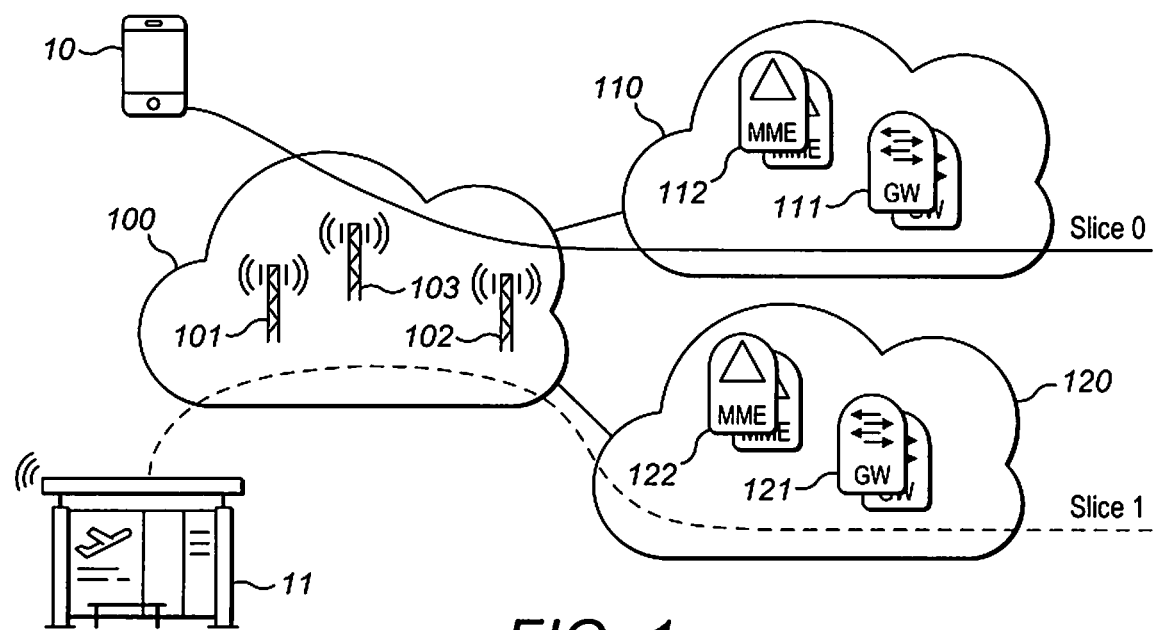
FIG. 1 schematically shows a network slice example.

Referring to FIG. 1, there is schematically shown an example of two network slices, slice 0 and slice 1, illustrating concepts used in this disclosure. More specifically, FIG. 1 illustrates a radio access network (RAN) 100 of a wireless communication network, a first core network (CN) instance 110 of the wireless communication network, and a second CN instance 120 of the wireless communication network. As illustrated, the RAN 100 includes multiple network elements 101,102,103. These network elements may correspond to cells and/or access nodes serving one or more cells. The first CN instance 110 includes CN nodes 111,112, and the second CN instance 120 includes CN nodes 121,122. Each CN node 111,112,121,122 is configured to perform a particular network function (NF). The CN nodes 111,112,121,122 of the respective CN instance 110,120 may, for example, include one or more gateways (GWs) 111,121, such as a serving gateway (SGW) or a packet data gateway (PGW) of an evolved packet core (EPC) serving the respective slice. Further, the CN nodes 111,112,121,122 may include one or more mobility management nodes 112,122, such as a mobility management entity (MME) of the respective EPC. However, it is noted that the CN instances could additionally or alternatively also include gateways or mobility management nodes of a 5G technology, e.g., the NR technology.

In this example, the first CN instance 110 is assigned to a first network slice, referred to as "slice 0", and the second CN instance 120 is assigned to a second network slice, referred to as "slice 1". FIG. 1 also illustrates an exemplary user equipment (UE) 10, receiving or sending traffic via slice 0, and an exemplary UE 11, receiving or sending traffic via slice 1. Slice 0 is illustrated schematically with a solid line passing between the UE 10, the RAN 100, and the CN 110. Slice 1 is illustrated schematically with a dashed line passing between the UE 11, the RAN 100, and the CN 120.

The example of FIG. 1 illustrates a one-to-one mapping between a network slice and a CN instance. However, it is noted that the concepts explained herein would also be applicable to scenarios where multiple network slices are supported by the same CN instance. Further, it is noted that the different CN instances 110,120 do not necessarily need to be implemented by separate physical hardware elements, but could also be implemented on the basis of different virtual CN nodes implemented by the same physical hardware element(s). For example, a GW 111 of the first CN instance 110 and a GW 121 of the second CN instance 120 could be implemented as virtual nodes on the same physical hardware element. Similarly, an MME 112 of the first CN instance 110 and an MME 122 of the second CN instance 120 could be implemented as virtual nodes on the same physical hardware element.

In the example of FIG. 1, the network slices may be used to support different services. For example, slice 0 could be a mobile broadband slice, while slice 1 could be a machine type communication network slice. However, various other kinds of services could be supported as well. The network slices could also be associated with different tenants, e.g., different customers of an operator of the wireless communication network. Each of these different customers could have an individual service level agreement (SLA) with the operator.

Whether a communication service is offered by a network operator or by an enterprise as a tenant on a network operator's network, in order to ensure that a network slice meets SLA requirements for the use case the network slice is enabling, the network slice may be subject to predetermined implementational and operational specifications. Such specifications may characterize the radio access technology, bandwidth, end-to-end latency, reliability, (guaranteed) quality of service, security, and isolation, among others. For example, a service level agreement (SLA) may be associated with a network slice, indicating the treatment to which services provided within the network slice should be subjected.

Furthermore, network slicing may be facilitated by providing supporting orchestration and management functions. In particular, such orchestration and management functions may enable faster and more flexible service creation from a time-to-market (TTM) perspective, and faster and more flexible service fulfilment from a time-to-customer (TTC) perspective, while permitting operational expenditure (OPEX) to be kept under control.

One approach to orchestrating and managing network slices involves the use of network slice blueprints, also called network slice templates or descriptors. A blueprint may provide an orchestration specification for a network slice. In particular, a blueprint may be configured to provide a complete description of the structure, configuration, and the work flows for the instantiation and control of a network slice instance during its lifecycle. A blueprint may describe the logical and/or physical resources, or components, of which a network slice is composed and how those resources are interconnected and configured to provide the desired characteristics and features of the network slice. It is particularly beneficial for a blueprint to be created in a machine-readable format, so that the provision of a network slice may be facilitated by automation of parts of the procedure. In this way, a blueprint may be automatically accessed and read, to specify the deployment and operational behavior requirements of a network slice.

Figure 2:
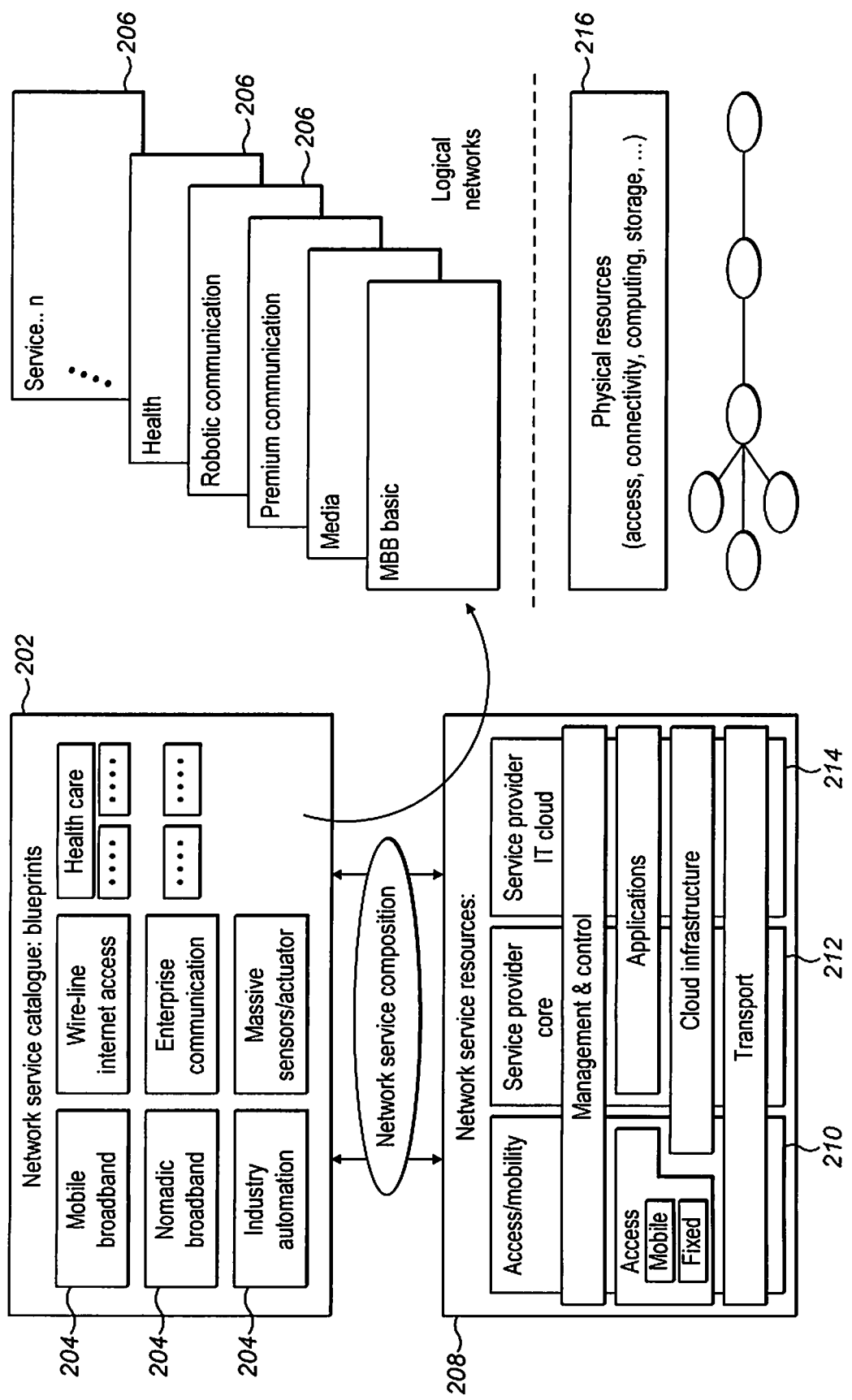
FIG. 2 schematically shows an example of blueprints for generating network slices.

FIG. 2 schematically shows an example of how a blueprint may be used in the generation of a network slice. A network service manager or the like (not shown) may have access to a catalogue, or repository, 202 of blueprints 204. A blueprint 204 may specify the deployment and operational behavior requirements of a network slice 206. Exemplary blueprints 204 may relate to communication services for mobile broadband, wire-line internet access, healthcare, nomadic broadband, enterprise communication, industry automation, and massive sensors/actuators, among others. Exemplary network slices 206 may relate to use cases for MBB basic, media, premium communication, robotic communication, and health, among others.

A blueprint 204 may specify one or more resources 208 required for the respective network slice 206 for which the blueprint serves as a deployment template. The one or more resources 208 may include one or more access or mobility resources 210, one or more service provider core resources 212, and/or one or more service provider cloud resources 214. The one or more resources 208 may be specified for one or more virtualized functions and/or physical functions supporting the network slice 206, the one or more functions relating to management and control, mobile access, fixed access, applications, cloud infrastructure, and/or transport.

In this way, using a blueprint 204, the resources 208 required to generate a network slice 206 may be specified, and the network slice may accordingly be created. The network slice 206 may be associated with one or more virtualized network functions (VNFs) and/or one or more physical network functions (PNFs). The one or more PNFs may be provided by physical resources 216, which may include physical infrastructure, or hardware, for one or more of access, connectivity, computing, and/or storage, among others.

As will be understood, a blueprint 204 may provide a specification for one or both of an access logical subnetwork and a core logical subnetwork. A blueprint 204 may include a specification for the control plane (CP) components and/or for the user plane (UP) components of the logical subnetwork(s) covered by the blueprint.

A blueprint 204 may be designed and onboarded in separate procedures, or workflows, from procedures/workflows relating to the design and/or onboarding of orchestration and/or management components for providing lifecycle management of a network slice 206. However, in some embodiments, a blueprint and an orchestration and/or management component may be supplied and onboarded as a single package.

Figure 3:
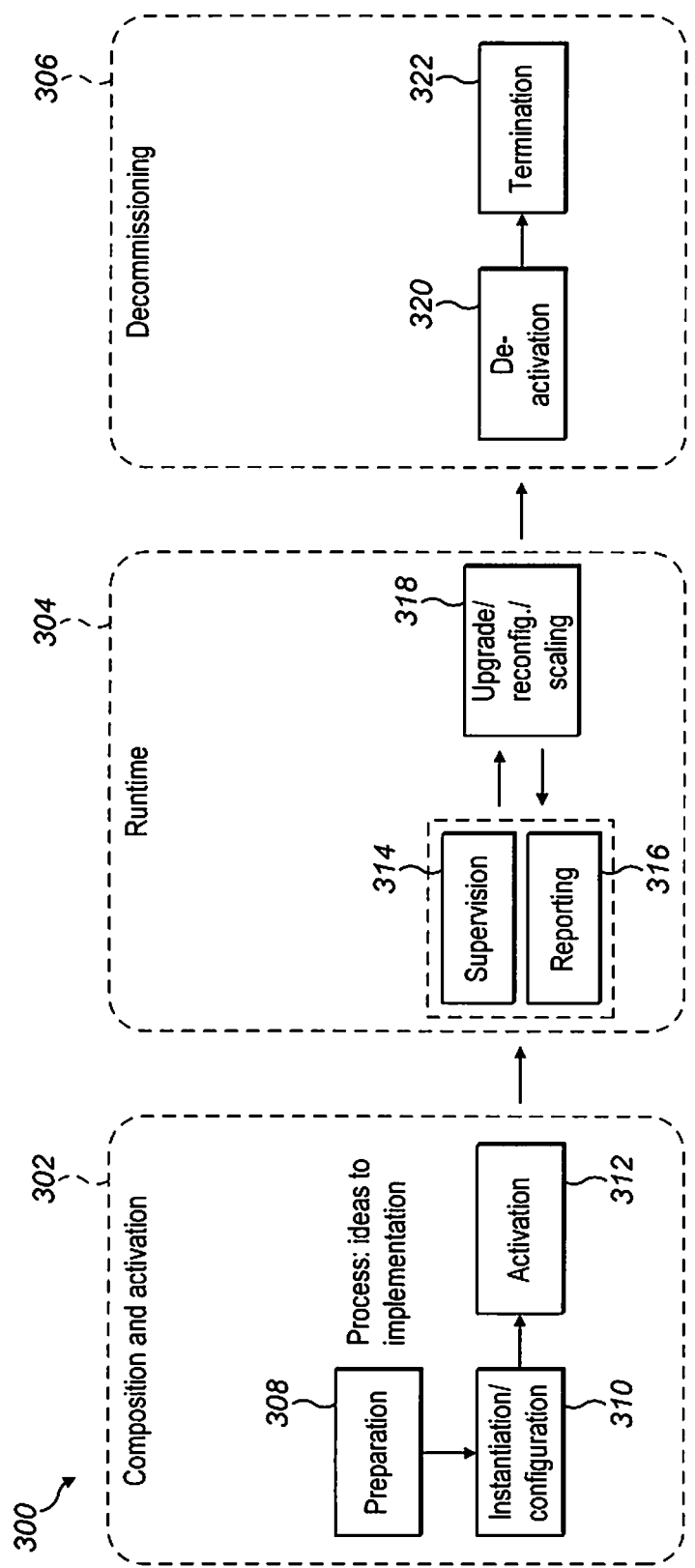
FIG. 3 schematically shows an exemplary lifecycle of a network slice.

Network slice lifecycle management (LCM) will now be described with reference to FIG. 3. In FIG. 3, an exemplary lifecycle 300 of a network slice is schematically illustrated. The lifecycle 300 includes a composition and activation stage 302, a runtime stage 304, and a decommissioning stage 306. The composition and activation stage 302 includes a preparation phase 308. The preparation phase 308 may include blueprint design and onboarding. The preparation phase 308 also includes preparing the network environment. Any shared resources, functions, and/or sub-network instances to be used by the network slice are instantiated and configured to be made available. Cloud and network function virtualization (NFV) resources are made available in the underlying systems. Any domains associated with the network slice expose an abstract representation of the domain infrastructure and topology to an orchestration manager to support decision-making at instantiation time. After the preparation phase 308, a network slice may be instantiated, in an instantiation and configuration phase 310, to create a network slice instance (NSI). An activation phase 312 follows and involves making the NSI active and ready to support communication services.

During operation, in the runtime stage 304, the NSI is subject to supervision 314 and performance reporting 316. This may include monitoring key performance indicators (KPIs) to ensure SLAs and other operational expectations are met. An upgrade, reconfiguration, and scaling phase 318 provides for modification of the NSI to account for requirements or changes in capacity, topology, performance requirements, and so on.

The decommissioning stage 306 covers the end of the lifecycle of a NSI. A deactivation phase 320 includes actions to bring the communication services provided by the NSI to an end and make the NSI inactive. A termination phase 322 may include decommissioning any non-shared elements or functions, and removing the NSI configuration from any shared elements or functions. At the end of this phase, the NSI is terminated.

Figure 4:
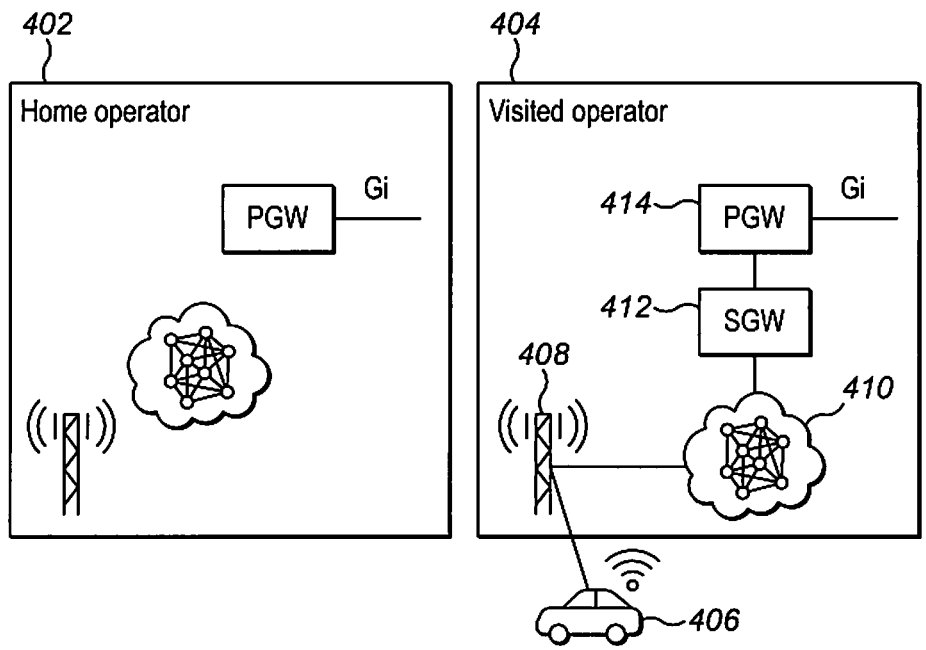
FIG. 4 schematically shows an example of local breakout.

FIG. 4 shows schematically an example of local break-out. In local break-out, services are accessed and executed in a visited network 404, without execution in a home network 402. In the example shown, a user device 406, in this case a vehicle, connects to a visited access network 408, to a visited core network 410, and to a visited serving gateway (SGW) 412 of the visited network 404. The visited SGW 412 connects to a visited packet data network (PDN) gateway (PGW) 414 for accessing and providing communication services requested by the user device 406. The home network 402 is not used in local break-out. Local break-out offers the advantage of acceptable service experience, but has the disadvantage that the home network 402 does not have control of the services. This can make it difficult for a communication service provider to ensure a consistent service experience between the home network 402 and any visited network 404.

Figure 5:
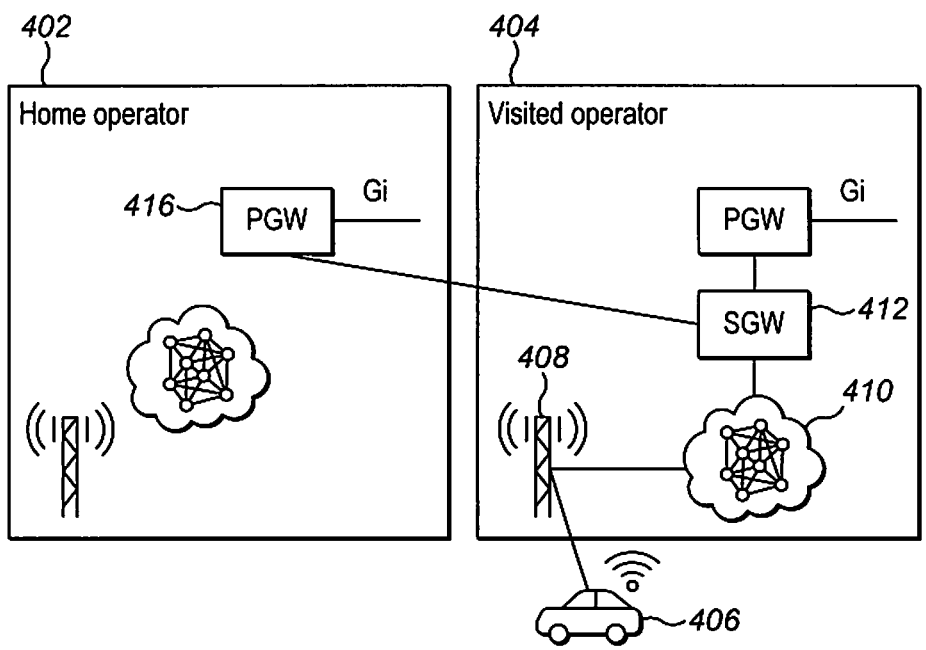
FIG. 5 schematically shows an example of home routing.

FIG. 5 shows schematically an example of home routing. In home routing, services are accessed in the visited network 404, but at least in part executed in the home network 402. In the example shown, the user device 406 connects to the visited access network 408, to the visited core network 410, and to the visited serving gateway (SGW) 412 of the visited network 404. The visited SGW 412 then connects to the home network 402, to a home PGW 416 for accessing and providing communication services requested by the user device 406. Home routing offers the advantage of maintaining service control by the home network 402, but has the disadvantage of potentially poor service experience, in particular in respect of latency and other SLA issues.

By taking advantage of network function virtualization, automation, and network slicing concepts, a different approach may be provided which may address at least some of the above shortcomings. In particular, a federated network slicing technique may be employed. A federated network slice, also called a network slice extension, is an extension of a network slice from a service providing domain beyond the bounds of the service providing domain. That is, a federated network slice may be arranged to be established and operational using both a service providing, or home, domain and also a partner, or visited, domain. In fact, a federated network slice may be arranged to be established and operational using a service providing, or home, domain and also two or more partner, or visited, domains.

Figure 6:
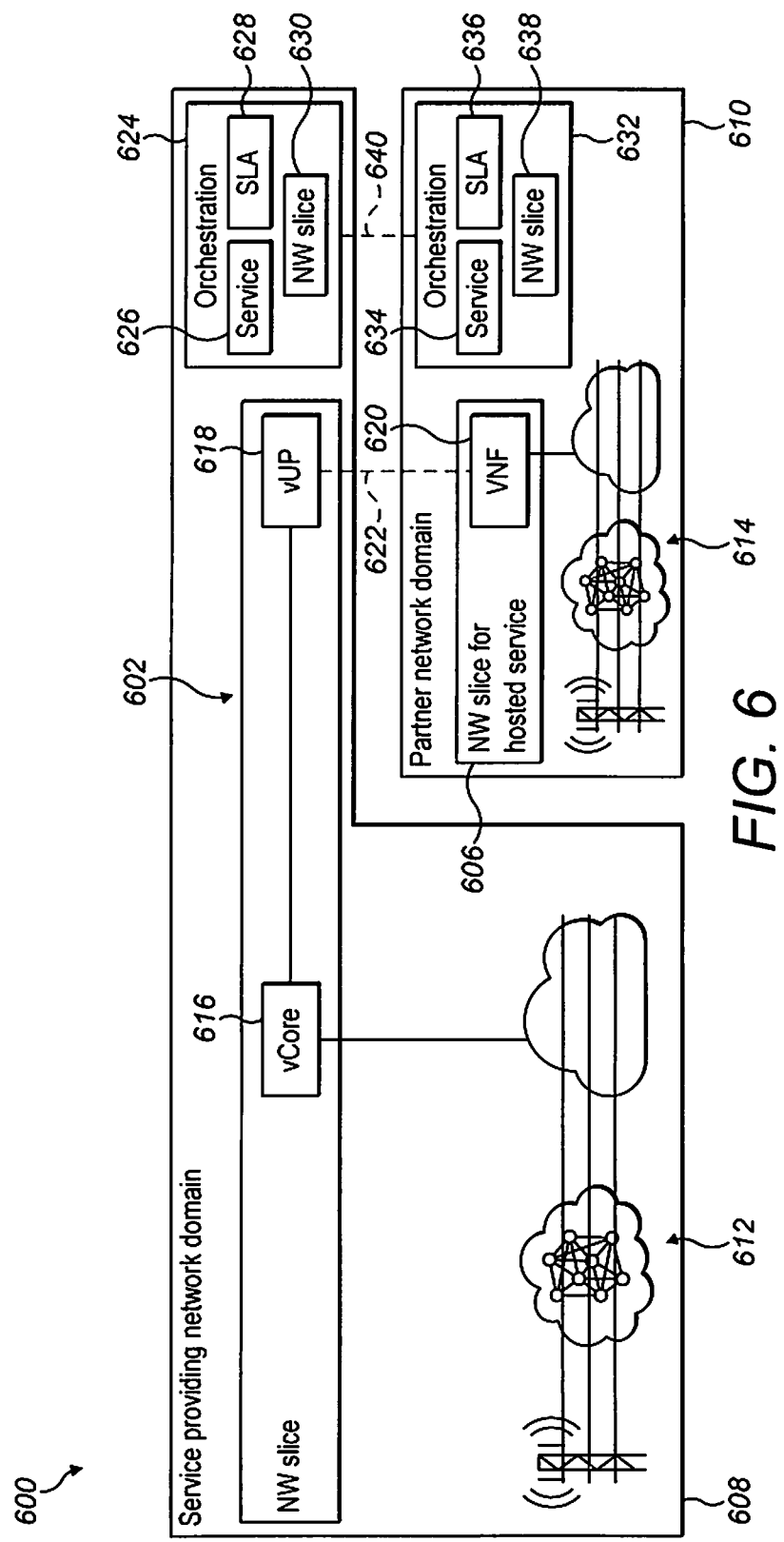
FIG. 6 schematically shows an embodiment of a system implementing a federated network slice.

FIG. 6 schematically illustrates an example of a system 600 implementing a federated network slice 602. The federated network slice 602 includes a first network sub-slice 604, which may be alternatively referred to as a home network sub-slice or a service providing network sub-slice, provided in a first network domain 608, which may be alternatively referred to as a home network domain or a service providing network domain. The federated network slice 602 also includes a second network sub-slice 606, which may be alternatively referred to as a visited network sub-slice or a partner network sub-slice, provided in a second network domain 610, which may be alternatively referred to as a visited network domain or a partner network domain. Together, the home network sub-slice 604 and the partner network sub-slice 606 form the federated network slice 602. The federated network slice 602 may be used to provide a communication service hosted in the partner network domain 610, but under the control and management of the home network domain 608.

The home network sub-slice 604 is provided on a home virtualized infrastructure 612. The home virtualized infrastructure 612 provides and supports virtualized core (vCore) functions 616 and virtualized user plane (vUP) functions 618 in the home network sub-slice 604. The partner network sub-slice 606 is provided on a partner virtualized infrastructure 614. The partner virtualized infrastructure 614 provides and supports virtualized network functions (VNF) 620 in the partner network sub-slice 606. Communication, including the transfer of data and/or instructions, between the home network sub-slice 604 and the partner network sub-slice 606 may take place via IP routing techniques, or using other communication protocols as may be desired. In this example, such communication may be provided by a link 622 between the vUP 618 of the home network sub-slice 604 and the VNF 620 of the partner network sub-slice 606.

In order to provide lifecycle management for the home network sub-slice 604, the home network domain 608 includes a home orchestrator 624. The home orchestrator 624 includes a service orchestration component 626 for orchestrating and managing one or more services available in the home network domain 608. The home orchestrator 624 also includes an SLA orchestration component 628 for ensuring performance requirements are met by services provided by the home network domain 608. The home orchestrator 624 also includes a network slice orchestration component 630 for orchestrating and managing one or more network slices, including network sub-slices, available in the home network domain 608.

In order to provide lifecycle management for the partner network sub-slice 606, the partner network domain 610 includes a partner orchestrator 632. The partner orchestrator 632 includes a service orchestration component 634 for orchestrating and managing one or more services available in the partner network domain 610. The partner orchestrator 632 also includes an SLA orchestration component 636 for ensuring performance requirements are met by services provided by the partner network domain 610. The partner orchestrator 632 also includes a network slice orchestration component 638 for orchestrating and managing one or more network slices, including network sub-slices, available in the partner network domain 610.

In order to provide lifecycle management for the federated network slice 602, the home orchestrator 624 may provide lifecycle management for the home network sub-slice 604. The home orchestrator 624 may also provide instructions over a control link 640 to the partner orchestrator 632 to provide lifecycle management for the partner network sub-slice 606. This may involve the partner orchestrator 632 instructing the network slice orchestration component 638 to orchestrate and manage the VNF 620 supporting the federated network slice 602. In one example, the control link 640 is provided by an operations and maintenance (O&M, or Os-Ma) interface between the home network domain 608 and the partner network domain 610.

Federated network slicing may therefore provide a way of offering communication services with global reach and also with compliance and control for SLA, or performance, requirements. This may be achieved in a way which allows for home network domain control and management to be maintained, to ensure service consistency with federated network slices across different partner network domains.

A challenge with federated network slicing, however, is that the network domains supporting a federated network slice may be provided by different network infrastructure, or hardware, equipment. In particular, the physical infrastructure resources and/or the virtual infrastructure resources of the network domains may be subject to orchestration and management by different, or vendor-specific, orchestration and management resources, including different, or vendor-specific, software. For example, one or more of the physical infrastructure resources, the virtual infrastructure resources, and/or the orchestration and management resources of the respective network domains may not be interoperable. There are many different manufacturers/vendors of network function equipment, so it is expected that many network domains will have network function equipment which is not interoperable with network function equipment of other network domains. In other words, first network function equipment of a first network domain may have associated first lifecycle management components for orchestration and management of first network functions supported by the first network function equipment, while second network function equipment of a second network domain may have associated second lifecycle management components for orchestration and management of second network functions supported by the second network function equipment. If the first and second lifecycle management components are vendor-specific and/or do not correspond, then it is not possible to orchestrate and manage a federated network slice.

In this specification, a network domain may refer to a given network operator's network as a whole. For example, one network domain may be a first network in a first country while another network domain may be a second network in a second country; alternatively, the network domains could be different networks provided within the same country. A network domain may alternatively, or also, refer to a given collection, or subset, of one or more systems, networks, and/or network elements under the control of a given entity. This may include a sub-network of a given network. The given entity may include one or more of a communication service provider, an enterprise offering a communication service, a tenant having a given degree of operational control on a network, and/or a network operator. A network domain may alternatively, or also, refer to a given collection, or subset, of virtualized infrastructure resources—including one or more of network access, network connectivity, compute, and/or storage resources—for providing a given virtualized network function. Still alternatively, or also, a network domain may include physical infrastructure resources and/or virtual infrastructure resources, and associated orchestration and management resources for lifecycle management of the physical infrastructure resources and/or virtual infrastructure resources. In a general sense, one network domain may be considered separate or different from another network domain by virtue of the network domains being controlled by different entities, or being provided by different entities or different operators, or being provided by different network infrastructure, or hardware, equipment, and/or being subject to orchestration and management by different, or vendor-specific, orchestration and management resources, including different, or vendor-specific, software.

Figure 7:
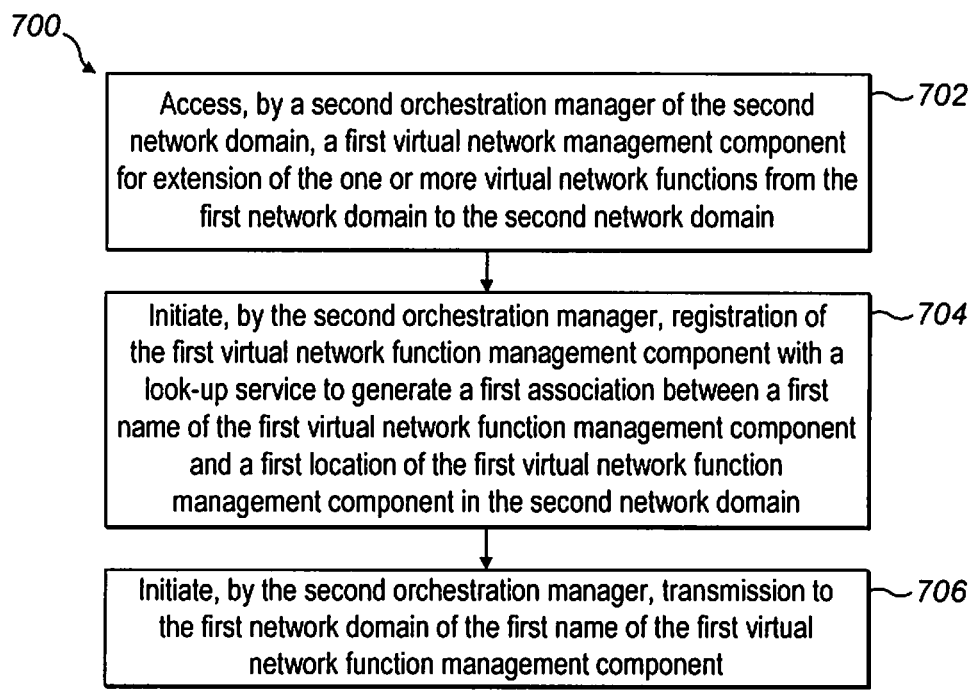
FIG. 7 schematically shows a method for managing a federated network slice, in accordance with one embodiment.

FIG. 7 shows a method 700 for managing a federated network slice, in accordance with one embodiment. The federated network slice provides an extension of one or more virtual network functions from a first network domain to a second network domain. The method 700 is described from the perspective of the second network domain; in particular, a second orchestration manager of the second network domain.

The method 700 begins at step 702 by accessing, by the second orchestration manager of the second network domain, a first virtual network function management component for extension of the one or more virtual network functions from the first network domain to the second network domain. At step 704, the method 700 includes initiating, by the second orchestration manager, registration of the first virtual network function management component with a look-up service to generate a first association between a first name of the first virtual network function management component and a first location of the first virtual network function management component in the second network domain. At step 706, the method 700 includes initiating, by the second orchestration manager, transmission to the first network domain of the first name of the first virtual network function management component.

The method 700 may be implemented to provide the first virtual network function management component ready, in the second network domain, for extension of the one or more virtual network functions from the first network domain to the second network domain. In this way, management of a federated network slice may be provided between the first network domain and the second network domain. In particular, the federated network slice may be orchestrated in the second network domain based on orchestration and management performed by the first virtual network function management component. Since the first virtual network function management component is arranged for extension of the one or more virtual network functions from the first network domain to the second network domain, problems with orchestration of, and/or interoperability between, first infrastructure resources of the first network domain and second infrastructure resources of the second network domain for the federated network slice may be overcome. A federated network slice may in this way be orchestrated in the second network domain, regardless of any differences in physical infrastructure, logical infrastructure, and/or associated orchestration and management resources between the first and second network domains which may exist prior to implementation of the described method. In particular, the described method provides for multivendor orchestration. The first virtual network function management component may support, orchestrate, and/or manage one or more vendor-specific virtual network functions from the first network domain in the second network domain. In this way, a federation agreement may be established between a first network domain and a second network domain, regardless of differences—in particular, vendor-specific or operator-specific differences—in physical infrastructure, logical infrastructure, and/or associated orchestration and management resources between the first and second network domains.

As part of a federated network slice orchestration process, the method 700 may ensure that one or more orchestration or workflow resources, for example orchestration or workflow software, which may be desired or required for deploying a virtual network function manager in the second network domain, is registered for use in the second network domain. Such orchestration or workflow resources may include vendor-specific software. In some embodiments, the first virtual network function management component may be provided as a virtual application, vApp. The vApp may be configured so as to be implemented by one or more virtual machines, VM(s), in the second network domain.

In one embodiment, before the accessing step 702, the second network domain may not include a virtual network function management component configured for extension of one or more virtual network functions from the first network domain to the second network domain. That is, the second network domain may not have any virtual network function management components which may be used to orchestrate and/or manage a federated network slice between the first and second network domains.

In another embodiment, before the accessing step 702, the second network domain may include a second virtual network function management component. However, the second virtual network function management component may be configured for orchestrating and/or managing one or more virtual network functions which are unrelated to the federated network slice. In such a case, the second virtual network function management component may not be configured for extension of one or more virtual network functions from the first network domain to the second network domain.

In another embodiment, before the accessing step 702, it may be that second infrastructure resources of the second network domain are not interoperable with first infrastructure resources of the first network domain for extension of the one or more virtual network functions from the first network domain to the second network domain. For example, the second infrastructure resources of the second network domain and the first infrastructure resources of the first network domain may be heterogeneous, or incompatible; in particular, they may be vendor-specific. Without the first virtual network function management component, the second infrastructure resources of the second network domain may not be interoperable with the first infrastructure resources of the first network domain in order to support the orchestration and/or management of a federated network slice.

In some embodiments, the first virtual network function management component includes a specific virtual network function manager, S-VNFM, component. In some embodiments, the S-VNFM component is specific to first infrastructure resources of the first network domain. For example, the first virtual network function management component may be configured specifically for orchestration, management, and/or control of one or more of physical infrastructure, logical infrastructure, and/or associated orchestration and management resources of the first network domain.

In some embodiments, the first virtual network function management component may alternatively or additionally include a container manager component. In this way, for example, the first virtual network function management component may provide middleware software which fulfils the role of container management for one or more virtual machines, VM(s), to be implemented in the second network domain. The container manager component may be specific to the physical infrastructure, logical infrastructure, and/or associated orchestration and management resources of the first network domain. In this way, the container management component may support a federated network slice between the first and second network domains.

In some embodiments, the first virtual network function management component may include a vendor-specific virtual network function manager component. In this way, vendor-specific virtual network functions based on vendor-specific equipment and/or resources may be extended from the first network domain to the second network domain.

In some embodiments, the first virtual network function management component is arranged for lifecycle management of the one or more virtual network functions to be extended to the second network domain. Thus, by registering the first virtual network function management component ready for use in the second network domain, the one or more virtual network functions to be extended to the second network domain may be orchestrated and managed. For example, the first virtual network function management component may be arranged for lifecycle management of the one or more virtual network functions using an orchestration specification, such as a blueprint, or template, based on concepts similar to those discussed in relation to FIG. 2. Additionally or alternatively, the first virtual network function management component may be arranged for lifecycle management of the one or more virtual network functions using a workflow based on concepts similar to those discussed in relation to FIG. 3.

In some embodiments, the method 700 further includes initiating, by the second orchestration manager, allocation of first resources in the second network domain for the first virtual network function management component. This step may take place after the accessing step 702 and before the initiating registration step 704. In this way, the second network domain environment may be prepared ready for subsequent instantiation of the first virtual network function management component.

In some embodiments, the method 700 further includes initiating, by the second orchestration manager, configuration of the first virtual network function management component for resource access in the second network domain. This step may take place after the accessing step 702 and before the initiating registration step 704. Furthermore, this step may take place after the allocation of first resources step above. In this way, the first virtual network function management component may be prepared ready to satisfy predetermined operational expectations or requirements.

In some embodiments, the second orchestration manager includes a network function virtualization orchestrator, NFVO, of the second network domain. A NFVO may be responsible for the orchestration of network function virtualization instance, NFVI, resources across multiple virtual infrastructure managers, VIMs, fulfilling one or more resource orchestration functions. A NFVO may also be responsible for the lifecycle management of network services, fulfilling one or more network service orchestration functions.

In some embodiments, the second orchestration manager accesses the first virtual network function management component in response to receiving a request for a federated network slice service between the first network domain and the second network domain. The federated network slice service may include one or more services to be provided by one or more federated network slices. The request may be received from the first network domain. The request may be received over an operations and maintenance (O&M or Os-Ma) interface between the first and second network domains. Such interface may facilitate orchestration and control communication between the first and second network domains.

In some embodiments, the method 700 further includes receiving, by the second orchestration manager, the first virtual network function management component before receiving the request for the federated network slice service. In this way, the first virtual network function management component may be onboarded with the second orchestration manager, ready for the request for the federated network slice service to be received and actioned. Such storing of the first virtual network function management component may be performed at any time beforehand.

In some embodiments, the first virtual network function management component is received by the second orchestration manager in an orchestration specification file. The orchestration specification file may provide a deployment template for the first virtual network function management component. One example of an orchestration specification file includes a network service descriptor. The orchestration specification file may set out orchestration workflow(s) for the first virtual network function management component to be one or more of accessed, instantiated, allocated resources, configured, and/or registered with a look-up service, among others. The orchestration specification file may also include information and instructions relating to a federated network slice service which the first virtual network function management component is configured to support. In one example, the orchestration specification file may be based on the concepts described in relation to FIGS. 2 and 3, but where references to a network slice are replaced with references to a more general federated network service.

A federated network slice may include more than one virtual network function. Where a first set of virtual network functions is provided based on a first set of infrastructure resources in the first network domain—for example, first vendor-specific resources—and a second set of virtual network functions is provided based on a second set of infrastructure resources in the first network domain—for example, second vendor-specific resources—then a respective virtual network function management component may be provided for extension of the respective set of virtual network functions from the first network domain to the second network domain.

In one embodiment, the federated network slice includes an extension of one or more second virtual network functions from the first network domain to the second network domain. The method 700 may further include accessing, by the second orchestration manager, a further virtual network function management component for extension of the one or more second virtual network functions from the first network domain to the second network domain. The method 700 may further include initiating, by the second orchestration manager, registration of the further virtual network function management component with the look-up service to generate a second association between a second name of the further virtual network function management component and a second location of the further virtual network function management component in the second network domain. The method 700 may further include initiating, by the second orchestration manager, transmission to the first network domain of the second name of the further virtual network function management component.

The method 700 is described from the perspective of the second network domain; in particular, a second orchestration manager of the second network domain. With the method 700, a first virtual network function management component may be accessed and registered ready for use in a second network domain. The first virtual network function management component may be used to orchestrate and manage the instantiation of a federated network slice; in particular, the instantiation of an extension of one or more virtual network functions from the first network domain to the second network domain.

Figure 8:
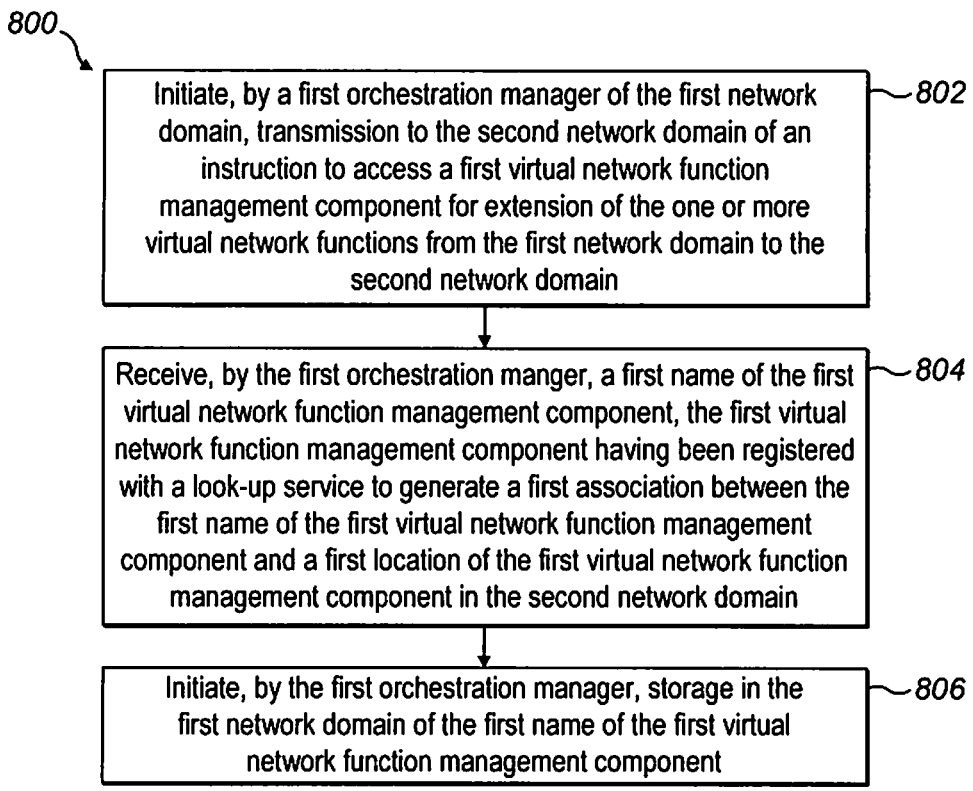
FIG. 8 schematically shows a method for managing a federated network slice, in accordance with one embodiment.

FIG. 8 shows a method 800 for managing a federated network slice, in accordance with a further embodiment. The method 800 is described from the perspective of the first network domain; in particular, a first orchestration manager of the first network domain.

The method 800 begins at step 802 by initiating, by the first orchestration manager of the first network domain, transmission to the second network domain of an instruction to access a first virtual network function management component for extension of the one or more virtual network functions from the first network domain to the second network domain. At step 804, the method 800 further includes receiving, by the first orchestration manager, a first name of the first virtual network function management component, the first virtual network function management component having been registered with a look-up service to generate a first association between the first name of the first virtual network function management component and a first location of the first virtual network function management component in the second network domain. At step 806, the method further includes initiating, by the first orchestration manager, storage in the first network domain of the first name of the first virtual network function management component.

In some embodiments, the method 800 further includes initiating, by the first orchestration manager, transmission to the second network domain of a request for a federated network slice service between the first network domain and the second network domain. The request may include the instruction to access the first virtual network function management component.

In some embodiments, the method 800 further includes providing, to the second orchestration manager of the second network domain, the first virtual network function management component before the initiation of transmission of the request for the federated network slice service.

In some embodiments, the first orchestration manager initiates storage of the first name of the first virtual network function management component in a domain manager of the first network domain. The domain manager in the first network domain may subsequently manage and/or control the federated network slice. In particular, the domain manager in the first network domain may manage and/or control one or more nodes and/or virtual network functions supporting the federated network slice in the second network domain.

Other features, functions, and embodiments described above in relation to the method 700 of FIG. 7 may also apply correspondingly to the method 800 of FIG. 8. As such, a repeat description of those features, functions, and embodiments will not be provided here.

The method 800 is described from the perspective of the first network domain; in particular, a first orchestration manager of the first network domain. With the method 800, a first orchestration manager of a first network domain may initiate steps for a first virtual network function management component to be accessed and registered ready for use in a second network domain. The first virtual network function management component may be used to orchestrate and manage the instantiation of a federated network slice; in particular, the instantiation of an extension of one or more virtual network functions from the first network domain to the second network domain. In some embodiments, the method 700 of FIG. 7 in the second network domain may be initiated by the method 800 of FIG. 8—in particular, by step 802—in the first network domain. When the first virtual network function management component has been registered with the look-up service in the second network domain, the reference name of the first virtual network function management component may be stored in the first network domain for future use. In particular, the reference name of the first virtual network function management component may be used in the initiation of the instantiation of a federated network slice, as will be described below.

Figure 9:
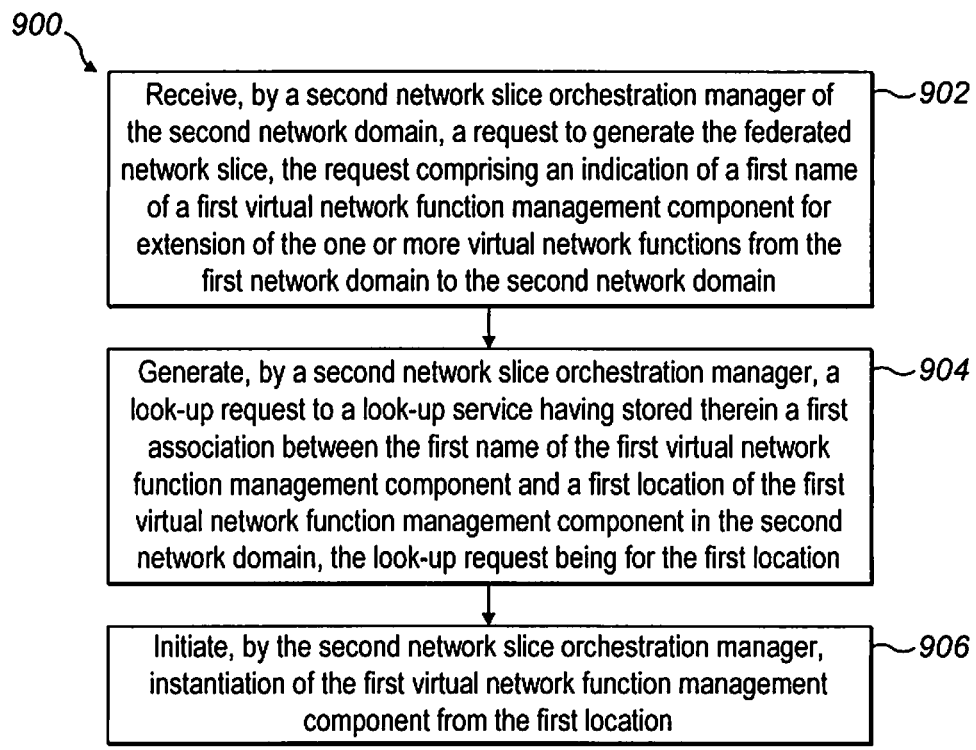
FIG. 9 schematically shows a method for managing a federated network slice, in accordance with one embodiment.

FIG. 9 shows a method 900 for managing a federated network slice, in accordance with a further embodiment. The method 900 is described from the perspective of the second network domain; in particular, a second network slice orchestration manager of the second network domain.

The method 900 begins at step 902 by receiving, by the second network slice orchestration manager of the second network domain, a request to generate a federated network slice. The request includes an indication of a first name of a first virtual network function management component for extension of one or more virtual network functions from the first network domain to the second network domain. At step 904, the method further includes generating, by the second network slice orchestration manager, a look-up request to a look-up service having stored therein a first association between the first name of the first virtual network function management component and a first location of the first virtual network function management component in the second network domain, the look-up request being for the first location. At step 906, the method further includes initiating, by the second network slice orchestration manager, instantiation of the first virtual network function management component from the first location.

In some embodiments, the method 900 further includes receiving, by the second network slice orchestration manager, a federated network slice template before receiving the request to generate the federated network slice. The template may set out orchestration workflow(s) for the federated network slice to be accessed, instantiated, allocated resources, and/or configured, among others. In one example, the federated network slice template may be based on the concepts described in relation to FIGS. 2 and 3, but where references to a network slice are replaced with references to a federated network slice.

In some embodiments, initiating instantiation of the first virtual network function management component from the first location includes the second network slice orchestration manager transmitting an instantiation request to a second orchestration manager of the second network domain. The instantiation request may include the location of the first virtual network function management component in the second network domain. The second orchestration manager may instantiate the first virtual network function management component in response to the instantiation request.

In some embodiments, the look-up service is configured to receive the look-up request and to provide the first location of the first virtual network function management component in the second network domain in response to the look-up request. The look-up service may be provided by a name server, or by a domain name system (DNS) server, or the like.

In some embodiments, the second network slice orchestration manager receives the request to generate the federated network slice over an operations and maintenance, O&M, interface between the first and second network domains. Such interface may facilitate operation and control communication between the first and second network domains. The O&M interface in the second network domain may be with a service orchestrator. The service orchestrator may in turn communicate with the second orchestration manager and/or the second network slice orchestration manager. Alternative communication channels and connections may alternatively be used, as will be understood.

Other features, functions, and embodiments described above in relation to the method 700 of FIG. 7 and/or to the method 800 of FIG. 8 may also apply correspondingly to the method 900 of FIG. 9. As such, a repeat description of those features, functions, and embodiments will not be provided here.

The method 900 is described from the perspective of the second network domain; in particular, a second network slice orchestration manager of the second network domain. With the method 900, steps to orchestrate and/or manage a federated network slice may be initiated. In particular, instantiation of a first virtual network function management component may be initiated in the second network domain. The first virtual network function management component may be used to orchestrate and manage the instantiation of the federated network slice; in particular, the instantiation of an extension of one or more virtual network functions from the first network domain to the second network domain.

In some embodiments, the method 700 of FIG. 7 and/or the method 800 of FIG. 8 may be performed before the method 900 of FIG. 9 is executed. That is, the first virtual network function management component may be accessed, instantiated, and registered ready for use. Then, a request to instantiate a federated network slice may be received, and the first virtual network function management component may be instantiated to provide orchestration and/or management of the instantiation of an extension of one or more virtual network functions from the first network domain to the second network domain.

Figure 10:
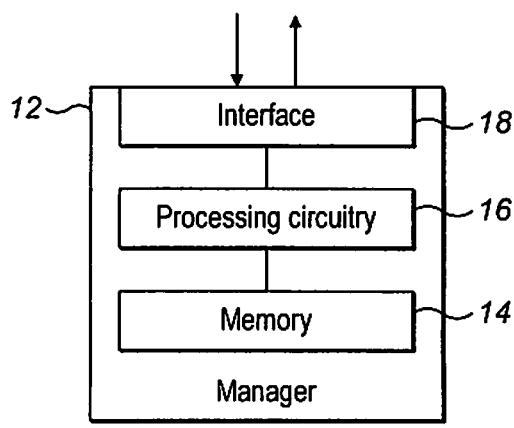
FIG. 10 schematically shows a manager device, in accordance with one embodiment.

FIG. 10 schematically shows a processor-based implementation of a device, in the form of a manager 12. The manager 12 may be used for implementing, performing, and/or supporting the methods and concepts described herein. In one embodiment, the manager 12 may be configured as the first orchestration manager of the first network domain. In another embodiment, the manager 12 may be configured as the second orchestration manager of the second network domain. In another embodiment, the manager 12 may be configured as the second network slice orchestration manager of the second network domain. In yet another embodiment, the manager 12 may be configured as the domain manager of the first network domain. It will be appreciated that multiple ones, or multiple virtual instantiations, of the manager 12 may be provided for a system including a combination of two or more of the first orchestration manager of the first network domain, the second orchestration manager of the second network domain, the second network slice orchestration manager of the second network domain, and/or the domain manager of the first network domain.

In the embodiment shown in FIG. 10, the manager 12 includes a memory 14, processing circuitry 16, and an interface 18. The interface 18 may include one or more interfaces for communicating with one or more other network nodes. The one or more network nodes may be one or more logical network node(s) or one or more physical network node(s).

The processing circuitry 16 may include one or more processors. The processing circuitry 16 is functionally or physically coupled to the interface 18. The processing circuitry 16 is also functionally or physically coupled to the memory 14. In one example, the memory 14, the processing circuitry 16, and the interface 18 may be coupled by one or more internal bus systems of the manager 12.

The memory 14 may include one or more of a Read-Only-Memory (ROM), e.g., a flash ROM; a Random Access Memory (RAM), e.g., a Dynamic RAM (DRAM) or a Static RAM (SRAM); a mass storage, e.g., a hard disk or a solid state disk; or the like. The memory 14 may include orchestration templates, workflows, and/or management and/or control components, software, firmware, and/or control parameters, among others. The memory 14 may include suitably configured program code to be executed by the processing circuitry 16 so as to implement the methods and features described herein, in relation to FIGS. 7 to 9, at least.

It is to be understood that the structures as illustrated in FIG. 10 are merely schematic and that the manager 12 may actually include further components which, for the sake of clarity, have not been illustrated; e.g., further interfaces or processing circuitry. The components of the manager 12 may be connected in series or to a bus, or in some other way. Also, it is to be understood that the memory 14 may include further program code for implementing other and/or known functionalities of a manager; in particular, the first orchestration manager of the first network domain, the second orchestration manager of the second network domain, the second network slice orchestration manager of the second network domain, and/or the domain manager of the first network domain. According to some embodiments, also a computer program may be provided for implementing functionalities of the manager 12; e.g., in the form of a physical medium storing the program code and/or other data to be stored in the memory 14, or by making the program code available for download or by streaming.

It is also to be understood that the manager 12 of FIG. 10 may be provided as a virtual manager 12. In one embodiment, the manager 12 may be provided in distributed resources, such as in cloud resources. When provided as a virtual manager, it will be appreciated that the memory 14, processing circuitry 16, and interface 18 may be provided as functional elements. The functional elements may be distributed in a logical network and not necessarily be directly physically connected. It is also to be understood that the manager 12 may be provided as a single-node device, or as a multi-node system.

In one embodiment, the manager 12 is configured as the second orchestration manager of the second network domain for managing a federated network slice. The second orchestration manager is configured to access a first virtual network function management component for extension of the one or more virtual network functions from the first network domain to the second network domain. The second orchestration manager is further configured to initiate registration of the first virtual network function management component with a look-up service to generate a first association between a first name of the first virtual network function management component and a first location of the first virtual network function management component in the second network domain. The second orchestration manager is further configured to initiate transmission to the first network domain of the first name of the first virtual network function management component.

In another embodiment, the manager 12 is configured as the first orchestration manager of the first network domain for managing a federated network slice. The first orchestration manager is configured to initiate transmission to the second network domain of an instruction to access a first virtual network function management component for extension of the one or more virtual network functions from the first network domain to the second network domain. The first orchestration manager is further configured to receive a first name of the first virtual network function management component, the first virtual network function management component having been registered with a look-up service to generate a first association between the first name of the first virtual network function management component and a first location of the first virtual network function management component in the second network domain. The first orchestration manager is further configured to initiate storage in the first network domain of the first name of the first virtual network function management component.

In another embodiment, the manager 12 is configured as the second network slice orchestration manager of the second network domain for managing a federated network slice. The second network slice orchestration manager is configured to receive a request to generate the federated network slice, the request comprising an indication of a first name of a first virtual network function management component for extension of the one or more virtual network functions from the first network domain to the second network domain. The second network slice orchestration manager is further configured to generate a look-up request to a look-up service having stored therein a first association between the first name of the first virtual network function management component and a first location of the first virtual network function management component in the second network domain, the look-up request being for the first location. The second network slice orchestration manager is further configured to initiate instantiation of the first virtual network function management component from the first location.

In another embodiment, the manager 12 is configured as the domain manager of the first network domain. The domain manager is configured to manage a federated network slice generated according to any of the methods described herein.

Other features, functions, and embodiments described above in relation to the method 700 of FIG. 7, and/or to the method 800 of FIG. 8, and/or to the method 900 of FIG. 9, may also apply correspondingly to the manager 12 of FIG. 10; in particular, to the manager 12 when configured as a respective one of the first orchestration manager of the first network domain, the second orchestration manager of the second network domain, the second network slice orchestration manager of the second network domain, and/or the domain manager of the first network domain. As such, a repeat description of those features, functions, and embodiments will not be provided here.

Figure 11:
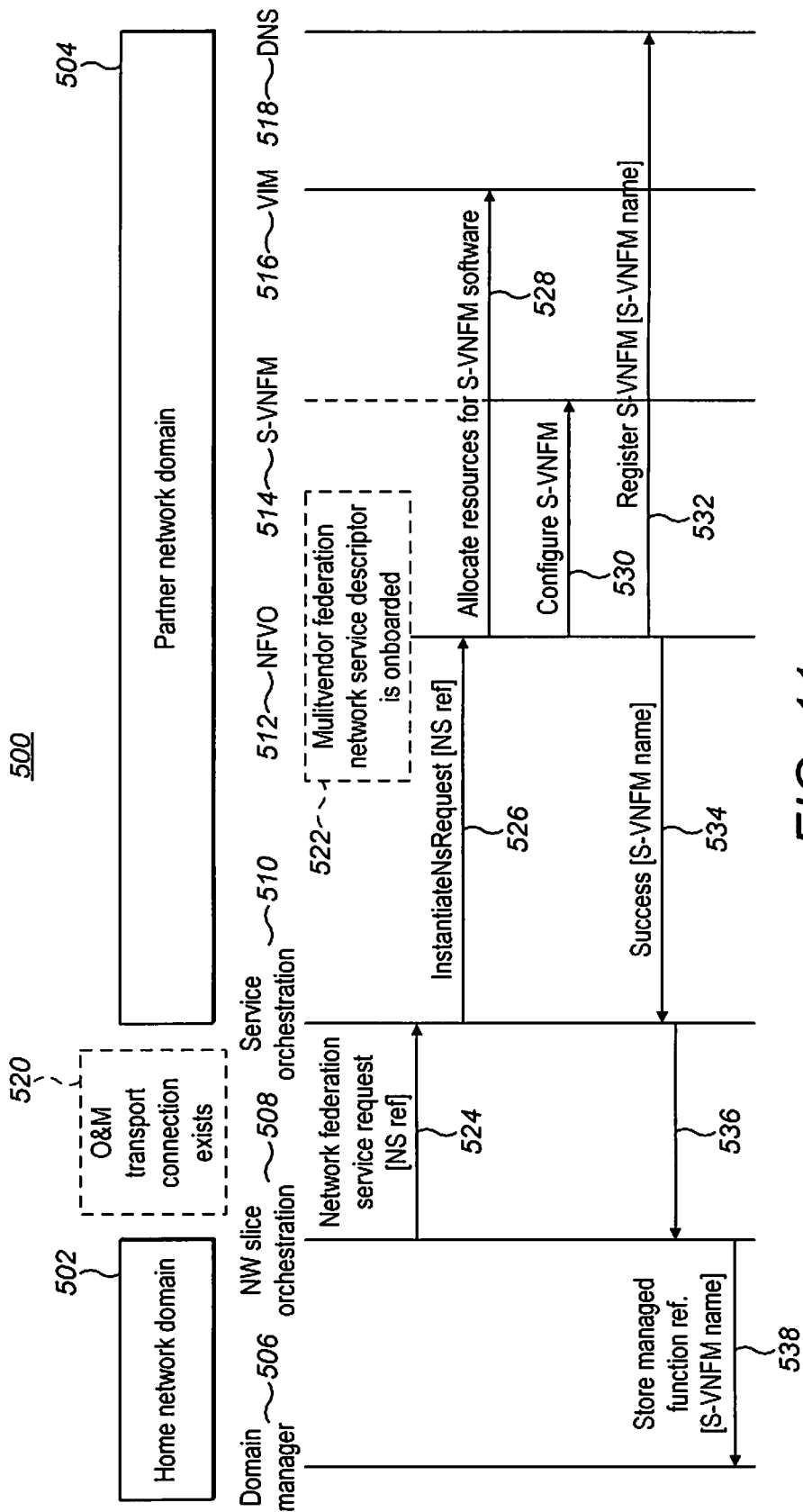
FIG. 11 schematically shows a sequence chart for enabling a S-VNFM for support of a federated network slice deployment, in accordance with one embodiment.

FIG. 11 schematically shows an embodiment implementing concepts and features described above. FIG. 11 shows an exemplary system 500, including a home network domain 502 and a partner network domain 504. In one example, the home network domain may be a service providing operator network and the partner network domain may be a partner operator network. However, as will be understood, the home network domain and the partner network domain may be other types of network domain, as described herein.

In FIG. 11, the home network domain 502 includes a domain manager 506 and a home orchestration manager in the form of a home network slice orchestration manager 508. In the home network domain 502, there are vendor-specific resources which are different from vendor-specific resources in the partner network domain 504, with the effect that a federated network slice between the first and second network domains 502,504 is not possible. The vendor-specific resources may include vendor-specific network function software. In this example, a virtual network function management component is specified in a federated network slice service orchestration specification as a virtual network function manager (VNFM) arranged to serve the role of a specific virtual network function manager (S-VNFM) 514. The S-VNFM 514 is arranged for orchestration and management of the vendor-specific resources, such as vendor-specific network function software. The vendor-specific resources deployed by the S-VNFM may be used to provide one or more network functions and/or one or more network nodes in the partner network domain 504.

As shown, the partner network domain 504 includes a service orchestration manager 510, a partner orchestration manager in the form of a partner network function virtualization orchestrator 512, a virtual network function management component in the form of the specific virtual network function manager (S-VNFM) 514, a virtualized infrastructure manager (VIM) 516, and a look-up service in the form of a domain name service (DNS) 518.

FIG. 11 shows a sequence chart of functionality of the various components of the system 500 for an exemplary implementation of the methods, features, and concepts described herein. In the sequence shown in FIG. 11, the S-VNFM 514 is accessed, instantiated, and registered, ready for use in supporting a federated network slice deployment.

As shown by the dashed box 520, a generic operations and maintenance (O&M) transport connection is provided between the home and partner network domains 502,504. This connection may be used for inter-domain signaling; in particular, between O&M management software.

As shown by the dashed box 522, in the partner network domain 504, an orchestration specification file in the form of a multivendor federation network service descriptor (MF-NSD) has already been provided. The MF-NSD is onboarded at the NFVO 512. In this example, the MF-NSD specifies one or more orchestration and/or workflow virtual application(s) to be used in the partner network domain 504 to provide lifecycle management of vendor-specific software for extension of one or more virtual network functions from the home network domain 502 to the partner network domain 504. In the case of there being more than one set of vendor-specific resources in the home network domain 502, there may be more than one MF-NSD onboarded in the NFVO 512 of the partner network domain 504. Before the partner network domain 504 can deploy a federated network slice, the one or more federated network slice services—in this example, labelled as a network service (NS)—is first instantiated.

At step 524, the home network slice orchestration manager 508 transmits a network federation service request to the partner service orchestration manager 510. The request is sent over the O&M (or Os-Ma) transport connection interface. The request indicates the name or reference of the network service (NS ref.) to be instantiated. In general terms, the home network slice orchestration manager 508 is an end-to-end orchestrator for a federated network service and provides management and control to the overall process.

At step 526, the partner service orchestration manager 510 transmits a request to instantiate the network service to the partner NFVO 512. The request is sent over a suitable signaling interface, such as an Os-Ma-NFVO interface. The request indicates the NS ref. of the NS to be instantiated. The MF-NSD may thereby be accessed by the partner NFVO 512.

The MF-NSD includes the S-VNFM 514 and a custom workflow for preparing the S-VNFM ready for operation. Until this point, the S-VNFM 514 has not been instantiated or deployed. This is shown in FIG. 11 by a dashed first portion of the timeline running downwards from the S-VNFM 514. The partner NFVO 512 accesses and instantiates the S-VNFM 514. Thereafter, the timeline for the S-VNFM 514 is shown by a solid line.

At step 528, the partner NFVO 512 transmits a request to allocate partner network domain resources for the S-VNFM 514 to the VIM 516. At step 530, the partner NFVO 512 configures the S-VNFM 514 for operation in the partner network domain 504. The S-VNFM 514 may be configured for cloud access in the partner network domain 504. This may be subject to one or more deployment constraints.

At step 532, the partner NFVO 512 transmits a request to register the S-VNFM 514 to the DNS 518. The request indicates the name of the S-VNFM 514 to be registered. The registration at the DNS 518 provides a location in the partner network domain 504 where the S-VNFM 514 may be called from. In this way, a network slice lifecycle management function in the partner network domain may use the DNS look-up service at instantiation of a federated network slice, to determine which S-VNFM to call workflows on. This is especially relevant in cases where there are multiple different, vendor-specific resources in the home network domain 502, with a corresponding number of different, vendor-specific S-VNFMs in the partner network domain 504.

Following instantiation and registration of the S-VNFM 514, at step 534, the partner NFVO 512 transmits a confirmation to the partner service orchestration manager 510. At step 536, the partner service orchestration manager 510 transmits the confirmation to the home network slice orchestration manager 508. The confirmation is sent over the O&M transport connection interface. The confirmation includes an indication of the S-VNFM name, to allow for subsequent requests to be made to the DNS 518.

At step 538, the home network slice orchestration manager 508 transmits a request to store the managed function reference—namely, the S-VNFM name—in the domain manager 506 of the home network domain 502. The request includes an indication of the S-VNFM name, for future reference.

During subsequent operation of the S-VNFM 514, the S-VNFM in the partner network domain 504 may use the O&M transport connection interface for communications between the domain manager 506 and the S-VNFM 514. The domain manager 506 generally manages the network functions and/or network nodes generated for a federated network slice in the partner network domain 504. Thus, the domain manager 506 may use the O&M transport connection interface to provide O&M software services to the S-VNFM 514. Such O&M software services may include management services and self-management services, among others. In addition, storing the S-VNFM name in the domain manager 506 also allows the domain manager to manage any upgrades to the S-VNFM which may be required after initial deployment of the S-VNFM.

Figure 12:
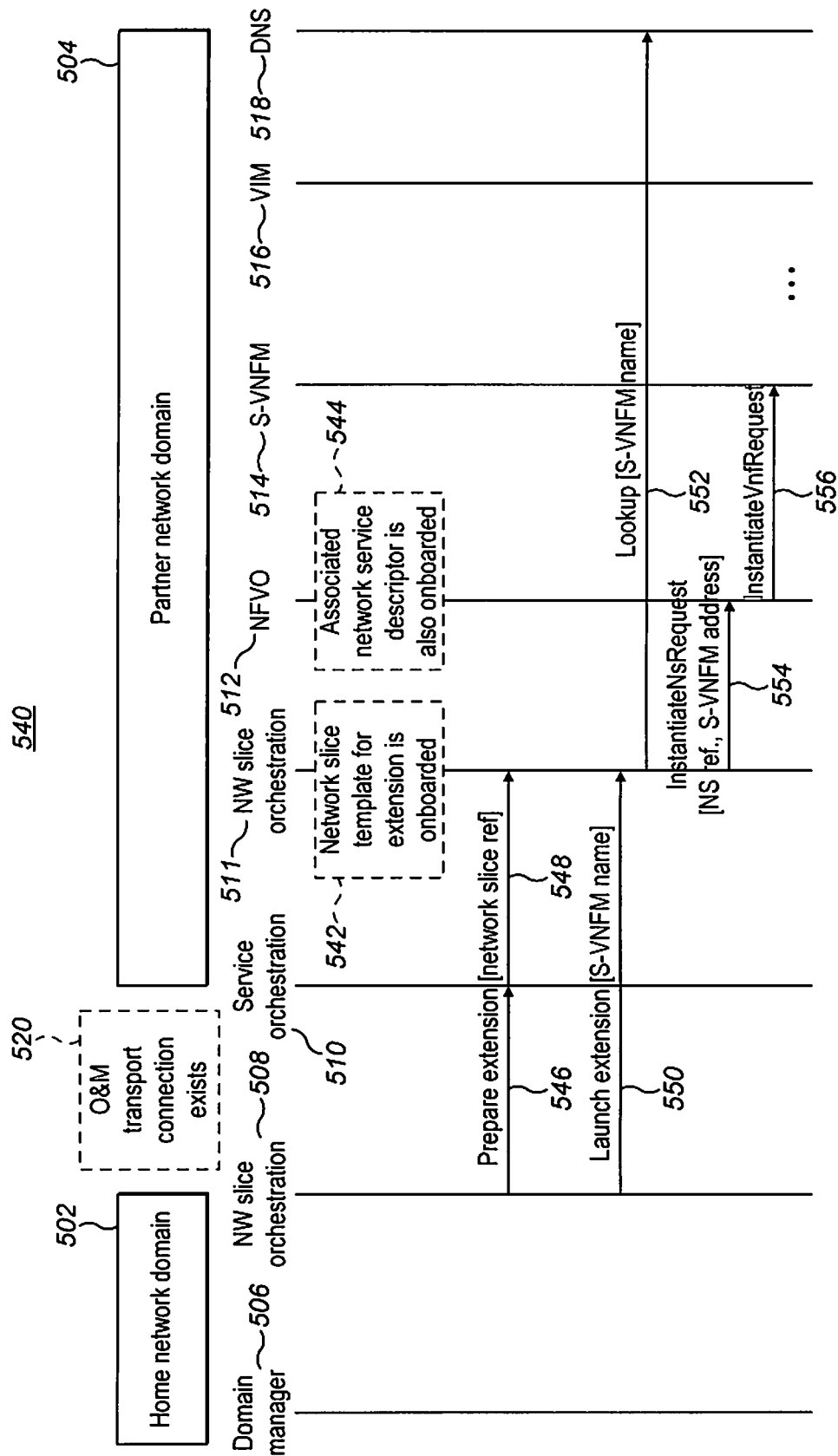
FIG. 12 schematically shows a sequence chart illustrating an operational workflow using the S-VNFM, in accordance with one embodiment.

The sequence chart of FIG. 11 shows an enablement workflow for enabling the S-VNFM 514 in the partner network domain. FIG. 12 shows a sequence chart illustrating an operational workflow using the S-VNFM 514. The sequence chart shown in FIG. 12 illustrates part of an instantiation process for a federated network slice. For example, referring to FIG. 3, the sequence chart shown in FIG. 12 may be considered to apply to a composition and activation stage 302; in particular, to an instantiation and configuration, or launch, phase 310 for a federated network slice.

FIG. 12 shows an exemplary system 540, similar to the system 500. The system 540 further shows a partner network slice orchestration manager 511 in the partner network domain 504.

As shown by the dashed box 542, in the partner network domain 504, an orchestration specification file in the form of a federated network slice template (FNST) has already been provided. The FNST is onboarded at the partner network slice orchestration manager 511. In this example, the FNST provides a blueprint for the federated network slice to be instantiated.

As shown by the dashed box 544, in the partner network domain 504, an orchestration specification file in the form of a federated network service descriptor (FNSD) has already been provided. The FNSD is onboarded at the NFVO 512. In this example, the FNSD specifies one or more orchestration and/or workflow virtual application(s) to be used in the partner network domain 504 to provide lifecycle management of the federated network service.

At step 546, the home network slice orchestration manager 508 transmits a request to prepare the federated network slice to the partner service orchestration manager 510. The request is sent over the O&M transport connection interface. The request indicates the name or reference of the federated network slice (Network Slice ref.) to be instantiated. At step 548, the partner service orchestration manager 510 passes the request to the partner network slice orchestration manager 511.

At step 550, the home network slice orchestration manager 508 transmits a request to launch the federated network slice to the partner network slice orchestration manager 511. The request includes an indication of the S-VNFM name, so that the partner network slice orchestration manager 511 may use the appropriate virtual network function manager—in this case, the S-VNFM 514—for orchestrating and managing one or more virtual network functions in support of the federated network slice. In this way, the S-VNFM 514 may be allocated resources and configured ready for activation.

At step 552, the partner network slice orchestration manager 511 transmits a look-up request to the DNS 518. The look-up request includes an indication of the S-VNFM name. The DNS 518 provides the location of the S-VNFM 514 in the partner network domain 504 for the partner NFVO 512 to call to. For example, the location may be an IP address, or other termination point, of the S-VNFM 514.

At step 554, the partner network slice orchestration manager 511 transmits a request to instantiate the network service to the partner NFVO 512. The request includes an indication of the network service to be instantiated (NS ref.) and an indication of the location of the S-VNFM 514 in the partner network domain 504 (S-VNFM address).

At step 556, the partner VNFO 512 transmits a request to instantiate one or more vendor-specific VNFs to the S-VNFM 514. The request is transmitted to the S-VNFM 514 using the provided location for the S-VNFM 514. The S-VNFM 514 will then orchestrate and manage the deployment of the one or more vendor-specific VNFs. Such further steps taken by the S-VNFM will not be described here, as such subsequent steps taken by a generic VNFM for orchestrating and managing a generic VNF may be applied in a corresponding manner to the S-VNFM 514.

In this way, the partner network domain 504 may support multi-vendor orchestration for vendor-specific VNFs supported by the deployed S-VNFM 514.

Another example implementing concepts and features described herein will now be provided.

A network operator, for example in Germany, (NO-DE) observes that the NO-DE is capable of offering services which extend beyond the national bounds of NO-DE, through existing inter-operator agreements and solutions, such as local breakout and home routing. However, based on the growth rate for such services and their characteristics, market analysis indicates that existing solutions in terms of time to market and time to customer, in addition to stricter latency and management requirements, will not be sufficient.

Using concepts, features, and embodiments described herein, the NO-DE may leverage its existing orchestration infrastructure and establish a federation roaming agreement with another network operator; for example, the most popular roaming neighbor for the NO-DE, a network operator in France (NO-FR).

Based on the established federation agreement between NO-DE and NO-FR, NO-DE may:

1) deploy virtual network functions (and/or application functions) onto NO-FR NFV infrastructure. This may be specified in pre-onboarded blueprints. Such blueprints may conform to Topology and Orchestration Specification for Cloud Applications (TOSCA) Service Templates;

2) have the deployed virtual network functions (and/or application functions) connected to NO-FR network nodes, such as traffic nodes, for example, to allow traffic to be directed to the deployed functions; and 3) establish other resources, such as transport virtual private network (VPN) connections, radio/RAN partitions/slices, among others, if needed or desired.

Through the establishment of the federation agreement, NO-DE note that NO-FR do not use the same network equipment vendor. This has the effect that the VNF orchestration solution for NO-FR is not compatible with the virtual network function software which NO-DE wishes to deploy in NO-FR.

To address this multi-vendor problem, NO-FR may agree to allow NO-DE to onboard a federated service orchestration specification. In this example, the federated service orchestration specification contains a VNFM fulfilling the role of an S-VNFM for NO-DE network equipment. In one example, the federated service orchestration specification may be provided in the form of a European Telecommunications Standards Institute (ETSI) Network Service Descriptor.

NO-DE subsequently triggers the instantiation of the network service in NO-FR. This results in the following actions taking place:

1) Instantiate S-VNFM;

2) Configure S-VNFM so it may access cloud infrastructure in NO-FR, subject perhaps to deployment constraints;

3) Register S-VNFM with a DNS look-up service or the like. In this way, the network slice lifecycle management function in NO-DE may use the look-up service at instantiation time to determine which S-VNFM to call workflows on; in particular, when there may be many S-VNFMs, one per vendor/operator; and 4) The service orchestration manager (for network service lifecycle management) in NO-FR informs the service orchestration manager in NO-DE that the network service (NS) is instantiated. This may be performed over the existing, established O&M transport connection. The acknowledgment includes the S-VNFM name of the instantiated S-VNFM, which is stored in the domain manager in NO-DE for future reference.

Subsequently, NO-DE is approached by an enterprise, for example, a German car manufacturer (Auto-DE). Auto-DE wishes to deploy a communication service with a new car model. For example, the communication service may be a streaming service on the new car model. Auto-DE wishes to offer the streaming service, not only nationally in Germany, but also in France, with ambition to grow its market share there.

Accordingly, using concepts, features, and embodiments described herein, NO-DE may create a network slice instance/deployment in NO-DE to host the requested Auto-DE service in Germany. NO-DE also uses the established federation agreement with NO-FR to extend the network slice beyond the bounds of NO-DE, so as to be able to offer the required Auto-DE service in France also.

The instantiation process for the federated network slice may include a preparation phase, a launch phase, and an activation phase, as described above. In the launch phase, the service orchestration manager in NO-DE may indicate the S-VNFM name so as to direct the service orchestration manager in NO-FR to which S-VNFM to use in order to instantiate the vendor-specific virtual network functions in NO-FR.

Figure 13:
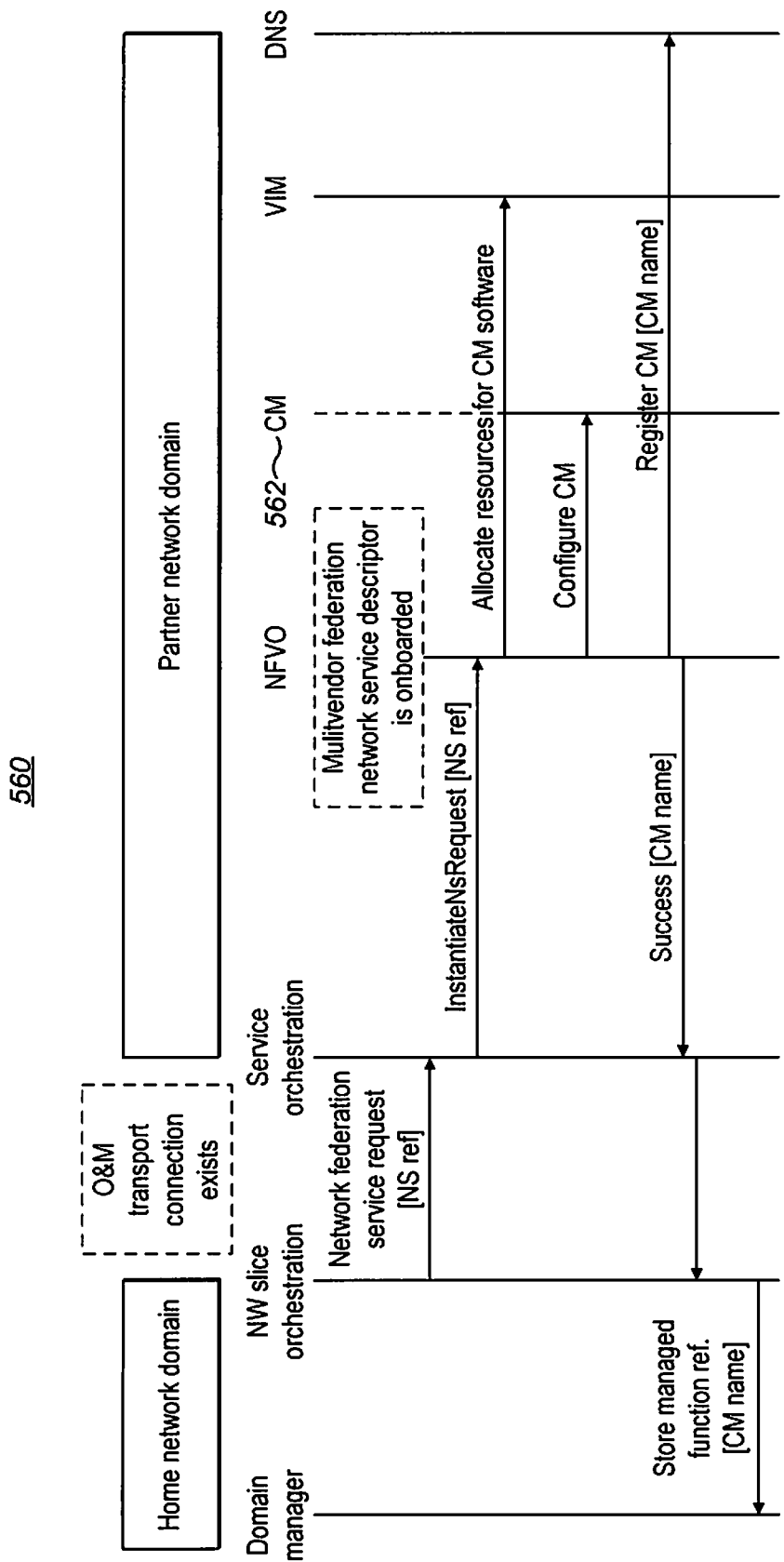
FIG. 13 schematically shows a sequence chart for enabling a container manager for support of a federated network slice deployment, in accordance with one embodiment.
Figure 14:
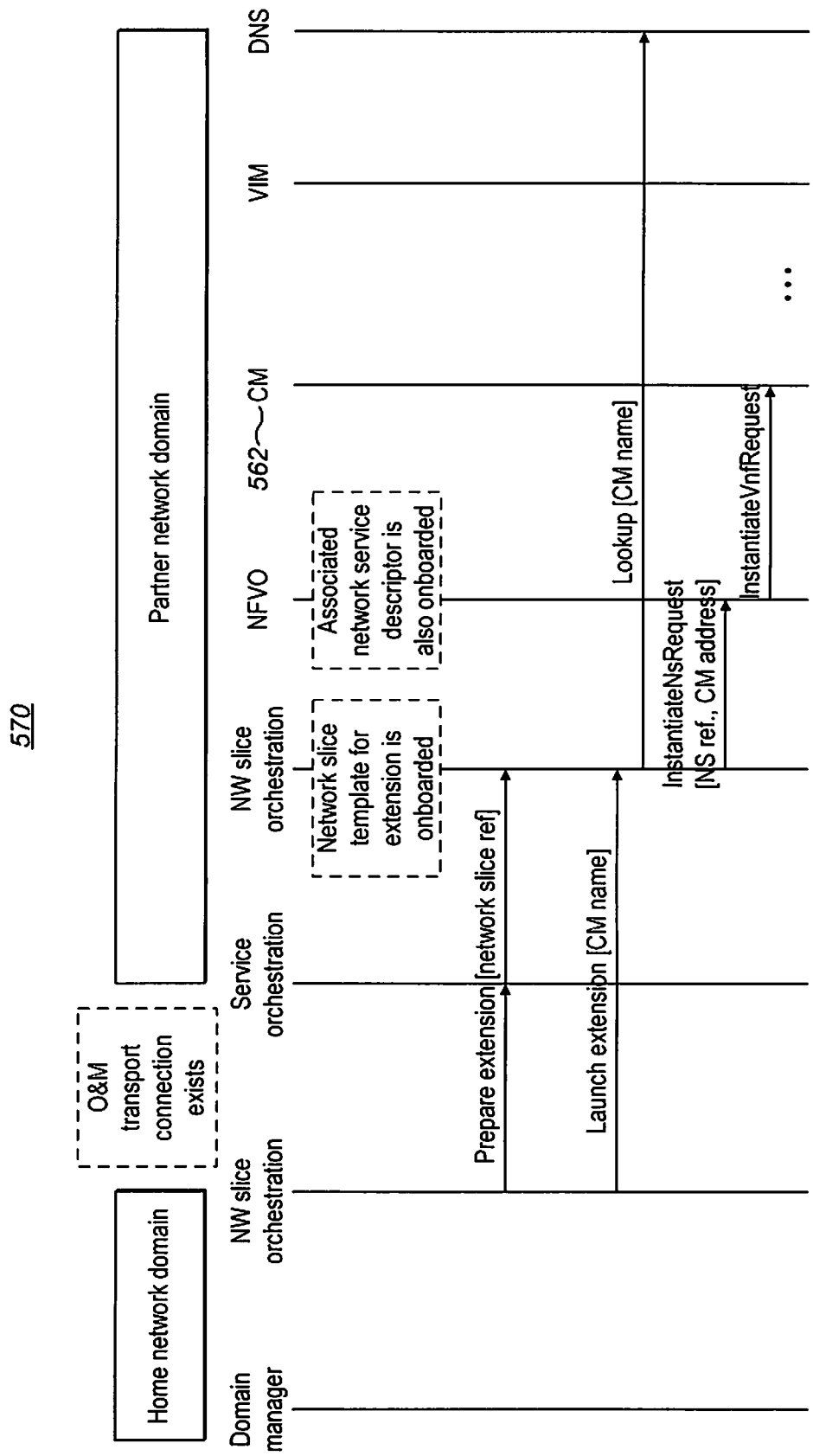
FIG. 14 schematically shows a sequence chart illustrating an operational workflow using the container manager, in accordance with one embodiment.

The sequence charts shown in FIGS. 11 and 12 have illustrated an example in which a S-VNFM 514 is enabled and used for orchestration and management of one or more virtual network functions in support of a federated network slice. FIGS. 13 and 14 show respectively similar sequence charts illustrating an example in which a container manager 562 is enabled and used for container management. The container manager 562 may provide vendor-specific middleware software for container management functions. The container management functions may apply to virtual machines running in the partner network domain 504 in support of a federated network slice. This may be so, regardless of which VIM may allocate the virtual machines in support of the federated network slice.

FIG. 13 shows an exemplary system 560. The system 560 is similar to the system 500 of FIG. 11, but the S-VNFM 514 has been replaced by a container manager (CM) 562. Furthermore, the references to S-VNFM features or parameters have been replaced by references to CM features or parameters. Similarly, FIG. 14 shows an exemplary system 570. The system 570 is similar to the system 540 of FIG. 12, but the S-VNFM 514 has been replaced by a container manager (CM) 562. Furthermore, the references to S-VNFM features or parameters have been replaced by references to CM features or parameters. Otherwise, the description relating to FIGS. 11 and 12 applies correspondingly to the container manager embodiments of FIGS. 13 and 14. As such, a repeat description of those features, functions, and embodiments will not be provided here.

Figure 15:
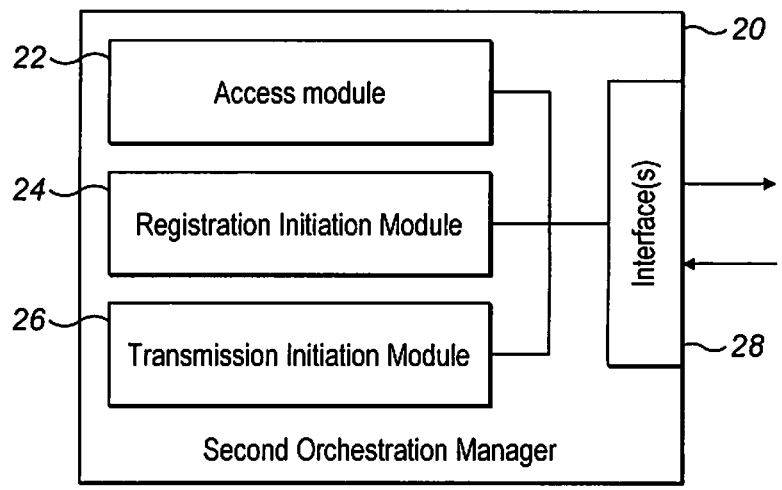
FIG. 15 schematically shows a block diagram illustrating functionalities of a second orchestration manager, in accordance with one embodiment.

FIG. 15 shows a block diagram for illustrating functionalities of a second orchestration manager 20 of a second network domain for managing a federated network slice. The second orchestration manager 20 operates according to the method of FIG. 7. As illustrated, the second orchestration manager 20 may be provided with an access module 22 configured to access a first virtual network function management component for extension of the one or more virtual network functions from the first network domain to the second network domain, such as explained in connection with step 702 of FIG. 7. Further, the second orchestration manager 20 may be provided with a registration initiation module 24 configured to initiate registration of the first virtual network function management component with a look-up service to generate a first association between a first name of the first virtual network function management component and a first location of the first virtual network function management component in the second network domain, such as explained in connection with step 704 of FIG. 7. Further, the second orchestration manager 20 may be provided with a transmission initiation module 26 configured to initiate transmission to the first network domain of the first name of the first virtual network function management component, such as explained in connection with step 706 of FIG. 7.

The second orchestration manager 20 may also include one or more interface 28 for connecting to the network and via the network to other elements of the network. Although FIG. 15 illustrates one embodiment in which the components of the second orchestration manager 20 are connected to a bus, it would be clear for a person skilled in the art that alternative embodiments are also possible, e.g. connecting the components in series. It is noted that the second orchestration manager 20 may include further modules for implementing other functionalities of an orchestration manager. Further, it is noted that the modules of the second orchestration manager 20 do not necessarily represent a hardware structure of the second orchestration manager 20, but may alternatively correspond to functional elements, e.g., implemented by hardware, software, or a combination thereof.

Figure 16:
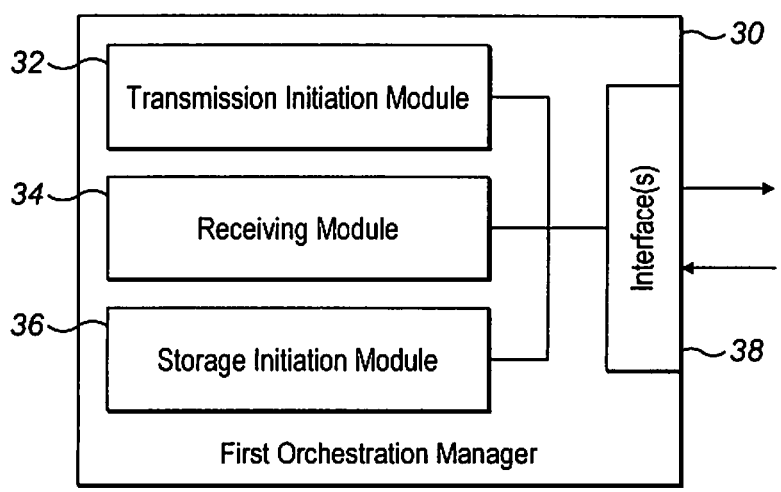
FIG. 16 schematically shows a block diagram illustrating functionalities of a first orchestration manager, in accordance with one embodiment.

FIG. 16 shows a block diagram for illustrating functionalities of a first orchestration manager 30 of a first network domain for managing a federated network slice. The first orchestration manager 30 operates according to the method of FIG. 8. As illustrated, the first orchestration manager 30 may be provided with a transmission initiation module 32 configured to initiate transmission to the second network domain of an instruction to access a first virtual network function management component for extension of the one or more virtual network functions from the first network domain to the second network domain, such as explained in connection with step 802 of FIG. 8. Further, the first orchestration manager 30 may be provided with a receiving module 34 configured to receive a first name of the first virtual network function management component, the first virtual network function management component having been registered with a look-up service to generate a first association between the first name of the first virtual network function management component and a first location of the first virtual network function management component in the second network domain, such as explained in connection with step 804 of FIG. 8. Further, the first orchestration manager 30 may be provided with a storage initiation module 36 configured to initiate storage in the first network domain of the first name of the first virtual network function management component, such as explained in connection with step 806 of FIG. 8.

The first orchestration manager 30 may also include one or more interface 38 for connecting to the network and via the network to other elements of the network. Although FIG. 16 illustrates one embodiment in which the components of the first orchestration manager 30 are connected to a bus, it would be clear for a person skilled in the art that alternative embodiments are also possible, e.g. connecting the components in series. It is noted that the first orchestration manager 30 may include further modules for implementing other functionalities of an orchestration manager. Further, it is noted that the modules of the first orchestration manager 30 do not necessarily represent a hardware structure of the first orchestration manager 30, but may alternatively correspond to functional elements, e.g., implemented by hardware, software, or a combination thereof.

Figure 17:
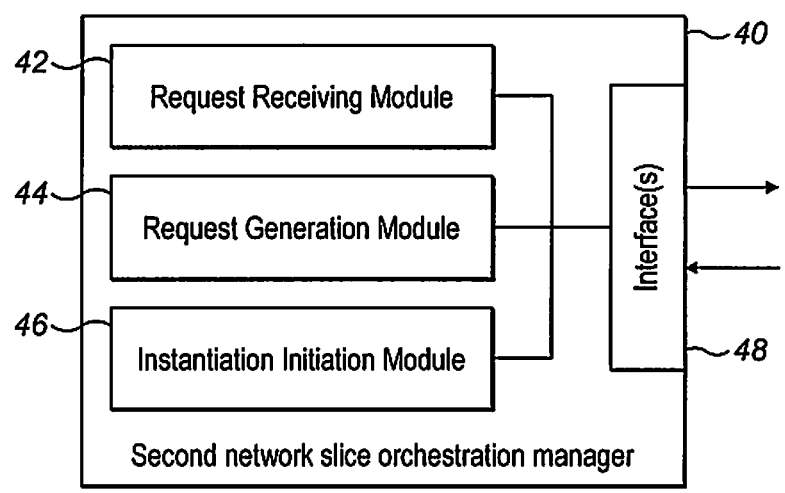
FIG. 17 schematically shows a block diagram illustrating functionalities of a second network slice orchestration manager, in accordance with one embodiment.

FIG. 17 shows a block diagram for illustrating functionalities of a second network slice orchestration manager 40 of a second network domain for managing a federated network slice. The second network slice orchestration manager 40 operates according to the method of FIG. 9. As illustrated, the second network slice orchestration manager 40 may be provided with a request receiving module 42 configured to receive a request to generate the federated network slice, the request comprising an indication of a first name of a first virtual network function management component for extension of the one or more virtual network functions from the first network domain to the second network domain, such as explained in connection with step 902 of FIG. 9. Further, the second network slice orchestration manager 40 may be provided with a request generation module 44 configured to generate a look-up request to a look-up service having stored therein a first association between the first name of the first virtual network function management component and a first location of the first virtual network function management component in the second network domain, the look-up request being for the first location, such as explained in connection with step 904 of FIG. 9. Further, the second network slice orchestration manager 40 may be provided with an instantiation initiation module 46 configured to initiate instantiation of the first virtual network function management component from the first location, such as explained in connection with step 906 of FIG. 9.

The second network slice orchestration manager 40 may also include one or more interface 48 for connecting to the network and via the network to other elements of the network. Although FIG. 17 illustrates one embodiment in which the components of the second network slice orchestration manager 40 are connected to a bus, it would be clear for a person skilled in the art that alternative embodiments are also possible, e.g. connecting the components in series. It is noted that the second network slice orchestration manager 40 may include further modules for implementing other functionalities of a network slice orchestration manager. Further, it is noted that the modules of the second network slice orchestration manager 40 do not necessarily represent a hardware structure of the second network slice orchestration manager 40, but may alternatively correspond to functional elements, e.g., implemented by hardware, software, or a combination thereof.

The above features, concepts, and embodiments relating to network slicing may be applied to a 4G network, e.g., based on the long-term evolution (LTE) technology specified by 3GPP, or to a 5G network, e.g., based on the new radio (NR) technology currently being developed by 3GPP, or to other network technologies and applications. Furthermore, one or more terms used in this specification may happen to correspond to a respective external term used in one or more other proposals, specifications, and/or standards relating to one or more of 4G, 5G, or other future network technologies; network slicing technologies; network functions virtualization technologies; and/or software-defined networking technologies, among others. In some embodiments, such a term may correspond to, or encompass, the meaning, definition, and/or function of such respective external term. In other embodiments, such a term may not correspond to the meaning, definition, and/or function of such respective external term, but may cover a different set of features and/or functions, as discussed in this specification.

Other variations, modifications, and embodiments will be apparent to the skilled person and are intended to form part of the invention.

The invention claimed is:

1. A method for managing a federated network slice, the federated network slice comprising an extension of one or more virtual network functions from a first network domain to a second network domain, the method comprising:
- accessing, by a second orchestration manager of the second network domain, a first virtual network function management component for extension of the one or more virtual network functions from the first network domain to the second network domain;
- initiating, by the second orchestration manager, registration of the first virtual network function management component with a look-up service to generate a first association between a first name of the first virtual network function management component and a first location of the first virtual network function management component in the second network domain; and
- initiating, by the second orchestration manager, transmission to the first network domain of the first name of the first virtual network function management component;
- wherein, before the accessing step, second infrastructure resources of the second network domain are not interoperable with first infrastructure resources of the first network domain for extension of the one or more virtual network functions from the first network domain to the second network domain.

2. The method of claim 1, wherein, before the accessing step, the second network domain does not comprise a virtual network function management component configured for extension of the one or more virtual network functions from the first network domain to the second network domain.

3. The method of claim 1, wherein, before the accessing step, the second network domain comprises a second virtual network function management component which is not configured for extension of the one or more virtual network functions from the first network domain to the second network domain.

4. The method of claim 1, wherein the first virtual network function management component comprises a specific virtual network function manager, S-VNFM, component.

5. The method of claim 4, wherein the S-VNFM component is specific to first infrastructure resources of the first network domain.

6. The method of claim 1, wherein the first virtual network function management component comprises a container manager component.

7. The method of claim 1, wherein the first virtual network function management component comprises a vendor-specific virtual network function manager component.

8. The method of claim 1, wherein the first virtual network function management component is arranged for lifecycle management of the one or more virtual network functions to be extended to the second network domain.

9. The method of claim 1, further comprising initiating, by the second orchestration manager, allocation of first resources in the second network domain for the first virtual network function management component.

10. A computer program, or a computer program product, comprising instructions which, when executed by processing circuitry, cause the processing circuitry to perform the method of claim 1.

11. A second orchestration manager of a second network domain for managing a federated network slice, the federated network slice comprising an extension of one or more virtual network functions from a first network domain to the second network domain, the second orchestration manager comprising processing circuitry and a memory, the memory storing instructions which, when executed by the processing circuitry, cause the processing circuitry to:
- access a first virtual network function management component for extension of the one or more virtual network functions from the first network domain to the second network domain;
- initiate registration of the first virtual network function management component with a look-up service to generate a first association between a first name of the first virtual network function management component and a first location of the first virtual network function management component in the second network domain; and
- initiate transmission to the first network domain of the first name of the first virtual network function management component;
- wherein, before the processing circuitry is caused to access the first virtual network function management component, second infrastructure resources of the second network domain are not interoperable with first infrastructure resources of the first network domain for extension of the one or more virtual network functions from the first network domain to the second network domain.

12. The second orchestration manager of claim 11, wherein, before the processing circuitry is caused to access the first virtual network function management component, the second network domain does not comprise a virtual network function management component configured for extension of the one or more virtual network functions from the first network domain to the second network domain.

13. The second orchestration manager of claim 11, wherein, before the processing circuitry is caused to access the first virtual network function management component, the second network domain comprises a second virtual network function management component which is not configured for extension of the one or more virtual network functions from the first network domain to the second network domain.

14. The second orchestration manager of claim 11, wherein the first virtual network function management component comprises a specific virtual network function manager, S-VNFM, component.

15. The second orchestration manager of claim 11, wherein the first virtual network function management component comprises a container manager component.

16. The second orchestration manager of claim 11, wherein the first virtual network function management component comprises a vendor-specific virtual network function manager component.

17. The second orchestration manager of claim 11, wherein the first virtual network function management component is arranged for lifecycle management of the one or more virtual network functions to be extended in the second network domain.

18. The second orchestration manager of claim 11, wherein the processing circuitry is further caused to initiate allocation of first resources in the second network domain for the first virtual network function management component.

* * * * *